Jan. 9, 1951 G. FLEISCHEL Re. 23,326
DEVICE FOR CONTROL AND OPERATION
BY FLUID SERVOMOTOR
Original Filed April 27, 1937 6 Sheets-Sheet 1
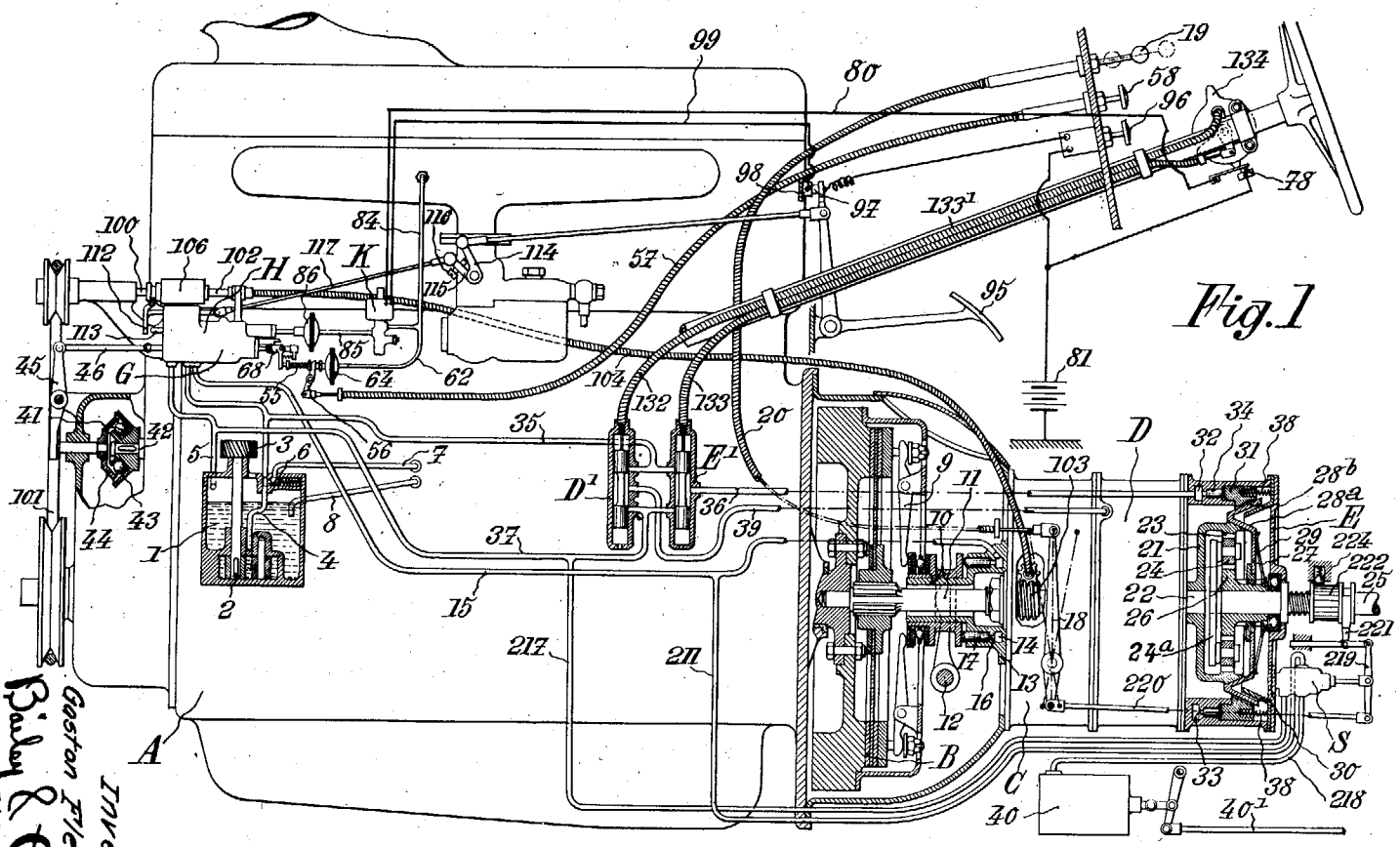
Inventor:
Gaston Fleischel,
Bailey & Carson
Attorneys Jan. 9, 1951
G. FLEISCHEL
DEVICE FOR CONTROL AND OPERATION
BY FLUID SERVOMOTOR
Re. 23,326
Original Filed April 27, 1937
6 Sheets-Sheet 2
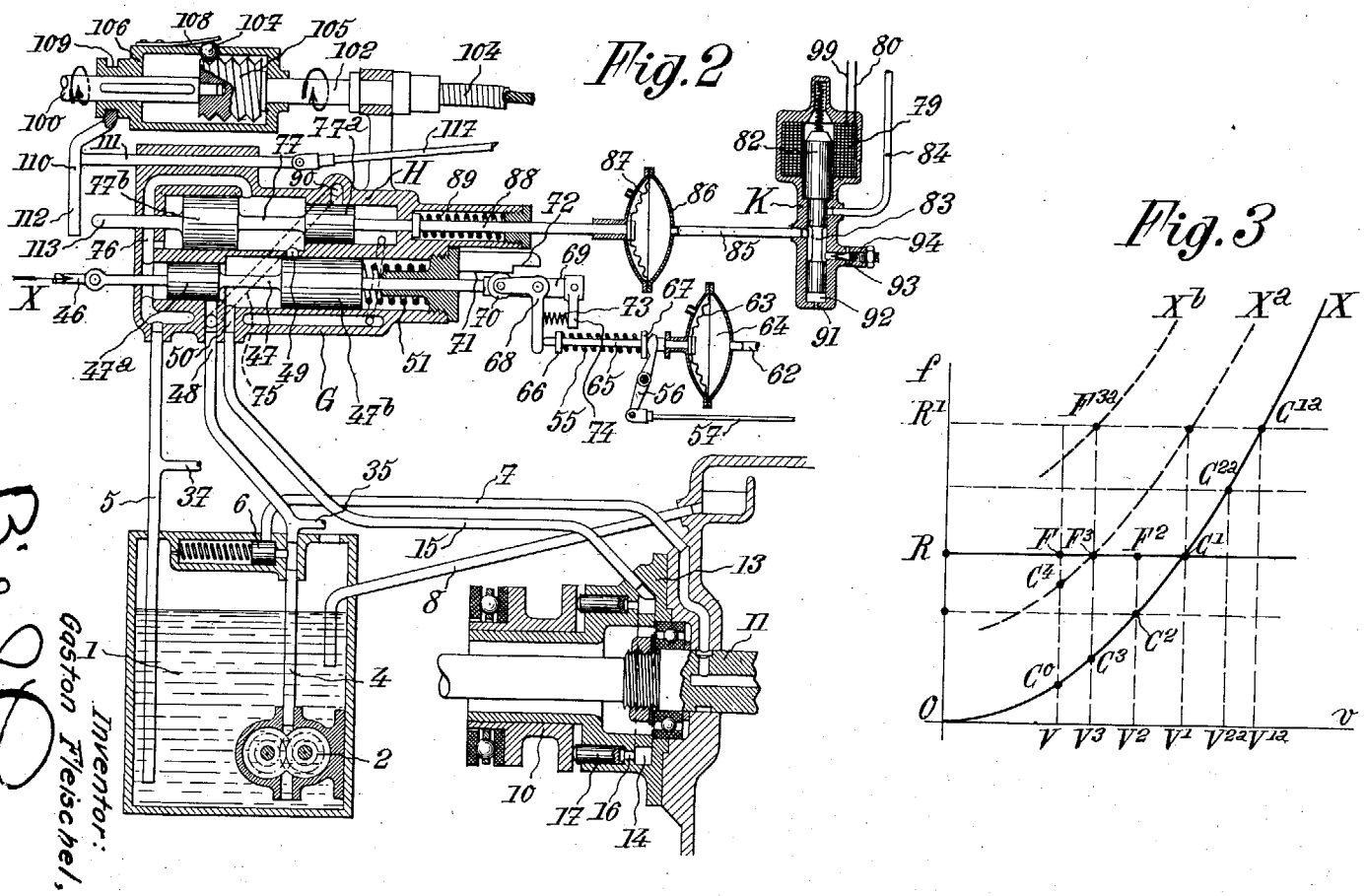
Inventor:
Gaston Fleischel,
Bailey & Larson
Attorneys Inventor:
Gaston Fleischel,
Bailey & Parsons
Attorneys Jan. 9, 1951 G. FLEISCHEL Re. 23,326

DEVICE FOR CONTROL AND OPERATION BY FLUID SERVOMOTOR

Original Filed April 27, 1937 6 Sheets-Sheet 4

Inventor:
Gaston Fleischel,
Bailey & Larson
Attorneys

Inventor:
Gaston Fleischel,
Bailey & Larson
Attorneys

Inventor:
Gaston Fleischel,
Bailey & Larson
Attorneys

Reissued Jan. 9, 1951

Re. 23,326

UNITED STATES PATENT OFFICE 23,326

DEVICE FOR CONTROL AND OPERATION BY FLUID SERVOMOTOR

Gaston Fleischel, Bleneau, France

Original No. 2,203,296, dated June 4, 1940, Serial No. 139,321, April 27, 1937. Application for reissue August 21, 1950, Serial No. 180,631. In France May 7, 1936

58 Claims. (Cl. 192—.07)

Matter enclosed in heavy brackets [ ] appears in the original patent but forms no part of this reissue specification; matter printed in italics indicates the additions made by reissue

The invention relates to devices for control and operation by fluid servo-motor; and it concerns more especially devices of this type utilised for the control and operation of transmissions for automobiles.

It has for its object, particularly, to make these devices such that they adapt themselves, better than at present, to the particular conditions in which these servo-motors must operate under the control of a selecting means (manual or automatic) to carry out a determined operation. More particularly, the purpose of the invention is to provide a control device for a fluid servo-motor which is arranged to change the gears in an automobile transmission, in which the distributor for the energizing fluid of the servo-motor is controlled in any suitable manner, with means operated by a force dependent on a modification of the operation of the transmission mechanism to control the distributor.

According to the invention, and more especially according to that of its methods of application as well as those of the methods of realisation of its various parts, to which it seems necessary to give preference, proposing to construct a device for the control and for the operation, by fluid servo-motor, of a variable-speed transmission for automobiles, one proceeds as follows, or in a similar manner and referring to the drawings wherein:

Fig. 1 shows a diagrammatic elevation (parts in section) the assembly of a variable speed transmission constructed according to the invention.

Fig. 2 shows, on a larger scale, the operating mechanism for the clutch of the transmission according to Fig. 1.

Fig. 3 shows an explanatory diagram of the operation of the controlling and operating mechanism of such a clutch.

Figure 4:
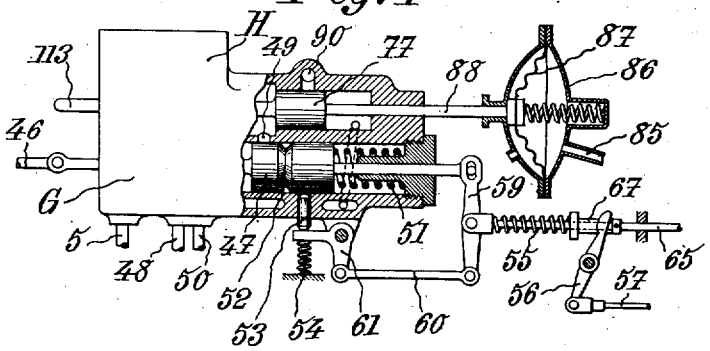
Fig. 4 shows, in elevation (part in section), a part of an operating mechanism of the clutch of the transmission according to Fig. 1 but constructed according to a variation.

There is designated here by the term "fluid servo-motor" and in the most general manner, any device which, under the control or the supervision of a selector mechanism functioning automatically or through the intervention of an operator, furnishes at the least partially and with the aid of an energy suitably accumulated in a fluid (liquid or even gaseous), the forces necessary for the carrying-out of certain determined operations, while strictly observing the selections given by the said selector mechanism. A movable member, called "distributor for the servo-motor," puts the servo-motor into and out of action, for example by admission, by gradual regulation or by suppression, of the energy accumulated in the driving fluid under the control of the selecting mechanism.

In order to explain the object of the invention there have been shown on the drawings transmissions for automobiles of a standard type comprising, for acting on the wheels of the vehicle (example of an operative part) members co-operating with the propelling group (engine A) such as a clutch B, for example of the friction type, a variable speed gear C, D, E of the planetary or (Fig. 8) sliding-gear type and mechanisms capable of resisting the propulsion when it becomes excessive or must be suppressed, such as the brakes of the vehicle. After the description of these examples it will be shown that the invention can also be applied to transmissions of a different or more particular kind.

It is proposed to operate these various mechanisms through the intermediary of fluid servo-motors, under control, automatic or non-automatic. It will be assumed, in the following, that the fluid utilised in these servo-motors is a liquid and more especially oil under pressure which can be that which is used for the lubrication of the engine or of the transmission. Of course, recourse could be had to any other source of pressure differential for power.

The oil under pressure can be furnished from any suitable source. However it may seem preferable to provide a special circuit for the supply of the servo-motor or servo-motors for example in order to utilise an oil different from that which lubricates the engine and to this end the following procedure may be adopted.

There is provided on the casing of the engine A an oil reservoir 1 in which is accommodated a pump 2, for example a gear-wheel pump, which is driven, through the intermediary of a pinion 3, by the engine A and particularly by the cam shaft 42 of the latter. The oil under pressure is delivered through the conduit 4 and the return of the oil into the reservoir 1 takes place through the discharge tube 5. As the pump functions constantly and as the operations by servo-motor only take place intermittently, there is provided in the delivery conduit 4 a valve 6 which limits the pressure to the desired value and permits the discharge of the oil into the piping 7 where it can be utilised for lubrication for example. It is of interest that the oil of the servo-motor is that which lubricates the transmission, but it can be different from that which lubricates the engine or the transmission, the return of this oil taking place through the tube 8 (Figs. 1 and 2).

The friction clutch B, provided between the engine A and the variable speed gear can be engaged, in the usual way, by springs (not shown) and can be disengaged through the intermediary of radial levers 9 pivoted at fixed points and the outer extremities of which tend to separate the friction linings of the clutch against the action of the said springs when the sleeve 10, capable of sliding about the input shaft 11 of the variable speed gear is displaced axially towards the left of Fig. 1. This displacement can be assured by a pedal operated shaft 12 or by an oil servo-motor under pressure constituted, for example, as follows.

In the end wall 13 of the clutch casing there is provided, concentrically to the shaft 11, an annular chamber 14, connected to a tube 15 filled with oil and opening into a distributor G regulating the pressure transmitted by this oil. The annular chamber 14 communicates, moreover, by passages 16 with several small cylinders in which are accommodated fingers 17, forming pistons and capable of driving the sleeve 10 back against the action of the clutching springs when the distributor G establishes communication between the delivery conduit 4 of the pump and the tube 15. There is thus obtained the disengagement of the clutch B and the uncoupling of the connection between the engine A and the variable speed gear. On the other hand, when the distributor G interrupts the above-mentioned connection and connects the tube 15 to the discharge tube 5, the pressure diminishes or ceases to act on the oil supplying the servo-motor 14—17 of the clutch and the springs of this latter produce its engagement.

For the example shown on Fig. 1 it has been supposed that the variable speed gear comprises a reversing device C separate from the variable speed gear D and E and which is arranged, as is well known, in such a way that when its operating arm 18 occupies its medium position all connection is interrupted between the variable speed gear proper and the assembly constituted by the engine A and the clutch B. When the said arm 18 occupies one of its extreme positions, the shaft 11 of the clutch is capable of driving the members of the variable speed gear D in the same direction and for its other extreme position the drive takes place with reversal of the direction of running. The operating arm 18 is remotely controlled by the driver, for example with the aid of a handle 19 (or of a lever) with three positions and connected to the said arm by a flexible or articulated connection 20. The reversing device is of absolutely any type and occupies absolutely any position. In the preferred form, however, the lever in its mean or central position disengages the reversing device so that no drive takes place therethrough. Displacement of the lever towards the right (in Fig. 1) causes forward drive, while displacement towards the left causes reverse drive.

The variable speed gear comprises, for the example according to Fig. 1, two simple planetary gear-boxes E and D, which are mounted end to end whilst having different transmission ratios. Moreover, the gear box E is operated by an independent servo-motor with which is associated the distributor $E^1$ independent of that $D^1$ of the other gear box D. As the constitution of the two gear boxes—with the exception of the ratio of the gears— is the same there has only been shown in section the box E which will be described in detail hereafter.

The box is provided, in the usual manner, with three groups of members. One driving group 21 is driven by the output shaft 22 of the gear box D and comprises for example a planetary gear 23 with interior teeth. This gear meshes with satellites 24 mounted on a support 24a keyed on the output shaft 25 of the gear box E. A central sun-wheel 26 constitutes, for example again, the third group which it is desirable to engage with another group, more especially with the planetary gear 23 in order to obtain the direct drive of the shaft 25 for the simple gear box E considered. On the other hand when the central sun-wheel 26 is held by braking with respect to the casing of the gear box E, the drive of the shaft 25 takes place at a reduced speed through the various gears. For this purpose there is mounted with a long keyway and on the hub of the central sun-wheel 26 a plate 27 carrying a peripheral rim for example double-coned. The said plate 27 is constantly urged towards the planet 23, integral with the input shaft 22, by a spring 29, for example, a resilient ring of concave form. When this spring can act freely, the conical part 28a of the rim is applied on the conical edge of the planetary gear 23 which assures the direct drive of the shaft 25 by the shaft 22. In order to obtain the driving at a reduced speed it is necessary to force the plate 27 back axially against the action of the spring 29 until the conical part 28b comes into contact with a fixed rim 30, of corresponding shape and mounted on the casing of the gear box E. Such a forcing back is obtained through the intermediary of an annular part 31 capable of sliding axially in its housing in order to come into contact with the peripheral rim of the plate 27 and in order to force this latter back which, at first, separates the conical part 28a from that comprised by the gear 23, and then applies the conical part 28b against the fixed rim 30. The axial displacement of the annular part 31 is obtained by the pressure of the oil by the pump 2 and transmitted by a conduit 35 to the distributor $E^1$ which, by being brought to its admission position, allows this pressure to act through a conduit 36 in an annular chamber 32 provided in the lateral wall of the gear box E, this chamber communicating by passages 33 with housings in which can slide fingers 34, in the form of small pistons, which act on the annular part 31 in order to force this latter back as indicated above.

When the distributor $E^1$ is brought to its exhaust position, the conduit 36 is put into communication, by the pipe 37, with the discharge pipe 5 in such a way that the pressure ceases to act in the chamber 32. Under the combined action of the spring 29 and of the return springs 38, the annular part is forced back axially towards the left of Fig. 1, which separates the conical part $28^b$ from the fixed rim 30 and again brings the conical part $28^a$ of the plate 27 into contact with that of the planetary gear 23 to re-establish direct drive. Under the action of its return springs 38 the annular part is then separated from the plate 27. The gear box D has a similar constitution and its distributor $D^1$ can supply this box with oil under pressure through the pipe 39 whilst the discharge takes place, advantageously, through the common pipe 37.

It should be noted that this type of planetary gear box permits the employment of its friction surfaces $28^a$ and $28^b$ without any dead point since it is precisely the putting into contact of the frictional engagement affecting the new ratio which causes the abandonment of the former ratio. The changing of the speed combinations can therefore take place at full load, which is an important advantage. Moreover the combination of the two simple gear boxes, of nearly similar ratios, permits of obtaining four speed ratios the engagement of which can be effected at full load.

Regarding the brakes of the vehicle, there has only been shown the transmitting rod $40^1$ which controls these mechanisms, which are constructed in the usual way, as well as a servo-motor 40 with oil under pressure or the like which serves for the operation of the brakes, this servo-motor being able to be combined with that which usually controls the brakes by the braking pedal or distinct from this servo-motor. It will be explained hereafter how the oil is supplied and distributed to the servo-motor 40.

Having thus described the essential members of the transmission to be constructed as well as the servo-motors through the intermediary of which the oil under pressure can assure the operation of these members, there will be set forth hereafter the actuating or controlling means for these servo-motors.

Regarding the clutch, it is proposed to render this control entirely automatic as much during the starting and stopping periods of the vehicle as during the changes of the speed combinations, the methods of operation of the clutch during these operations being, as is well known, essentially different. It is known, in effect, that during the starting the engagement of the clutch must be suitably and progressively controlled according to the running of the engine and of the vehicle, a too-slow engagement causing racing of the engine and a too-rapid or abrupt engagement the stalling of this latter. On the other hand, during the speed changes the operation of the clutch must assure a more or less decisive disengagement and be as rapid as possible. For an ordinary and non-automatic friction clutch the driver can adapt his control to the circumstances which arise. On the other hand, when the control is entirely automatic, for example subordinated to the action of a centrifugal governor driven by the engine, it is necessary to provide special devices which, at any moment, are ready to come into action to assure a suitable engagement or disengagement of the clutch. Thus during the starting period it is necessary that below a certain speed of rotation $V^2$ of the engine the clutch is completely disengaged, that above the speed of rotation $V^2$ the engagement commences and increases when the speed of rotation of the engine increases, and that according to another speed of rotation $V^1$ of the engine, the engagement is complete.

In order to control the clutch there is preferably utilised a centrifugal governor 41 driven by the engine, particularly by the cam shaft 42 of the latter, this governor comprising for example a ball cage 43 with cylindrical housings inclined for example at 45° on the shaft 42 and in which are accommodated balls of the governor 41. These latter are projected, by the centrifugal force, against a cone 44 movable axially and which, through the intermediary of an oscillating lever 45 and of a connecting rod 46, acts on the slide valve 47 of the distributor G for the servo-motor 14—17 of the clutch B. As the governor 41 need only displace the slide valve 47 of light weight and slight friction and without being influenced by the reactions which are produced during the operations of the clutch, this governor can be constituted in a simple, economic and little cumbersome manner and its action, as an actuating and controlling mechanism, is made more sensitive and more efficient.

The slide valve 47 is appointed to control the servo-motor 14—17 of the clutch B during the starting and stopping of the vehicle. This slide valve is shown on Fig. 2 at its mean position for which it closes at the same time both the outlet 48 of the delivery conduit 4 of the pump 2 and the orifice 49, through which the oil can escape towards the discharge pipe 5. The inlet 50 of the feed conduit 15 of the clutch servo-motor 14—17 occupies such a position that it is never covered by the slide valve 47.

The slide valve 47 is influenced by a return spring 51 the stress R of which acts in the opposite direction to the thrust of the force X of the centrifugal governor 41.

Such a control is already self-regulating for so long as the centrifugal force X remains lower than the power R of the spring, that is to say as long as the speed of rotation of the engine is less than $V^2$, the slide valve 47 is pushed back by the spring 51 towards a position for which the outlet 48 is uncovered in such a way that the pressure of the fluid acts through the pipe 15 and disengages the clutch. If the operation of the engine becomes such that the force X exceeds the power R of the spring, that is to say that the speed of rotation $V^2$ is exceeded, the slide valve 47 is moved towards a position for which the outlet 48 is closed and the discharge orifice 49 uncovered, which permits the engagement of the clutch. If the effort thus required from the engine is high, it slows down; the force X diminishes from this fact until the outlet 48 is opened and the discharge orifice 49 closed, which causes the disengagement of the clutch. This disengagement unloads the engine which accelerates and thus causes the engagement of the clutch. There is consequently obtained an auto-regulation leading to a stable state of equilibrium, but the energy utilized is completely brought into action or totally suppressed, which action may cause unpleasant jerks in the operation.

In order to obviate this disadvantage the slide valve 47 is arranged in such a manner that it is capable of undergoing a reaction from the oil pressure. This reaction is, of course, chosen with the same orders of magnitude as those adopted for the centrifugal governor 41 and the spring 51. In this way, a progressive variation of the pressure of the oil is made to intervene between the two extreme values of said pressure which corresponds respectively to the engagement and disengagement of the clutch.

This reaction is obtained by adopting a partial equilibrium for the slide valve 47 by giving different values to the diameters of the obturating parts of the slide valve 47. The transverse section of the part 47[a] which can obturate the outlet 48 is, for example, smaller than that of the part 47[b] which can obturate the discharge orifice 49. This difference in diameters gives rise to an axial thrust P proportional to the pressure of the oil and to the difference of the sections and directed, in this case, in the same direction as the force X of the governor 41 and against the power R of the spring 51.

In order fully to understand the important modifications thus applied to the operation, it is expedient to examine the diagram of Fig. 3. In this has been shown as abscissae along O*v* the speeds of rotation of the engine and as ordinates along O*f*, the different forces which act on the slide valve 47 of the distributor G.

The force X of the governor is indicated for a speed of rotation V of the engine, by a variable force $VC^0$ the extremity of which $C^0$ is always on the parabola X corresponding to the centrifugal force produced by the governor 41. The constant power of the spring 51 is indicated by the horizontal R.

At any speed of rotation V of the engine, the force $VC^0$, developed by the centrifugal governor 41, and the thrust P resulting from the pressure of the oil on the unequal surfaces of the slide valve 47 are added together for they are in the same direction and their sum is in opposition to the power R of the spring 51.

Therefore, at any speed of rotation V of the engine, the slide valve 41 is only in equilibrium if the pressure of the oil, in the distributor G, has such a value that the thrust it develops is equal to $C^0F$. If the pressure P were lower, the spring 51 would gain superiority and the slide valve 47 would uncover the outlet 48 for the oil under pressure in such a way as to increase the pressure until the thrust P has reached the value $C^0F$, at which value the movement would stop due to equilibrium of the forces acting on the slide valve.

If, on the contrary, the pressure became excessive, that is to say the thrust P greater than $C^0F$ the combined forces X and P, would become greater than R and the slide valve would be displaced in the opposite direction, which, after having, if necessary, interrupted the supply of oil under pressure through the outlet 48, would uncover the discharge orifice 49 for the pressure. Then the slide valve 47 would again resume a stable position of equilibrium for which the orifices 48 and 49 would be closed.

It is therefore seen that, in any event, the pressure of the oil to the servo-motor of the clutch has for a speed of rotation V of the engine, the value corresponding to the thrust $C^0F$ of the diagram and that this pressure gradually changes at the same time as the thrust $C^0F$ when the speed of rotation V of the engine varies, and this in spite of the fact that the oil pressure produced by the pump 2 is constant.

The pressure of the oil downstream of the distributor has therefore become a variable which, in this case, is a function of the speed of the engine but which could quite as well be made a function of any other functional factor of the engine or of the vehicle. This progressive variation, which is utilised for the operation of the clutch between the speeds of rotation $V^2$ and $V^1$ of the engine, is added to the auto-regulating operation mentioned above, in order completely to eliminate the jerks which the operation by "all or nothing" would have been able to allow to exist.

The variation of the forces which act respectively in this case on the slide valve 47 can be summarised by the formula $$X+P=R$$

As X is variable and R constant, P is necessarily variable as a function of X.

It is advantageous to dimension the active surface of the piston or pistons 17 of the servo-clutch, in such a way that for a pressure of the oil giving a thrust greater than $C^2F^2$, which corresponds to the speed of rotation $V^2$ of the engine, the clutch B is completely disengaged and applied, for example, against a projection which absorbs the excess thrust developed; and so that at the speed of rotation $V^1$ of the engine the pressure becomes ineffectual with the thrust, as shown by the diagram at the point $C^1$, it is sufficient that the power R given to the spring 51 is equal to the centrifugal force $V^1C^1$ developed at the speed of rotation $V^1$ of the engine.

Between the two speeds of rotation $V^2$ and $V^1$ the engagement which is null at $V^2$, increases with the speed of rotation of the engine in order to become complete at the speed of rotation $V^1$. This very progressive engagement, the limits $V^1$ and $V^2$ of which can be chosen at will with a view to the better result to be obtained and which intervenes for an operation already auto-regulating by itself, eliminates all jerks during starting, whatever may be the speed at which this latter takes place. Moreover, an operation has been obtained according to the so-called "centrifugal" principle of the clutch without modifying the standard clutch in any way and without interposing in the clutch itself heavy rotary masses, which is a very substantial advantage from the constructional point of view.

Again, other important improvements can be very simply applied to the device such as described. It is proposed, for example, to avoid, with the control described, a characteristic defect of centrifugal clutches with rotating masses. With these latter, in consequence of their almost symmetrical operation when it is a question of an engagement by acceleration of the engine or of a disengagement by slowing-down, it is very difficult to determine the speeds of rotation $V^2$ and $V^1$ of the engine so that they shall be equally favourable in both cases. Generally a progressive disengagement is useless and it commences too soon at the speed of rotation $V^1$ upon slowing-down. On the other hand if the speed of rotation $V^1$ for which the disengagement commences is lowered, the engagement at starting is terminated at a too-low speed of rotation of the engine for which it does not yet develop a sufficient couple.

It can easily be obtained with the device, such as described, that the mode of disengagement of the clutch at the time of slowing-down shall be different and shall take place at a speed of rotation other than that for the engagement at the time of starting. This permits of adopting the most advantageous values for each case.

If it is desired for example that the disengagement shall only take place at a speed of rotation $V^3$ of the engine, completely independent of the speeds of rotation $V^1$ and $V^2$, it is sufficient to provide, as shown on Fig. 4, in the slide valve 47 (or in a part integral in movement with this latter) a peripheral groove or notch 52, with which co-operates a bolt 53, influenced by a spring 54 of constant or regulatable power. The engagement of the bolt 53 in its housing 52 can only take place when the slide valve 47 occupies a position for which the clutch is completely engaged, that is to say for which the outlet 48 is closed and the discharge orifice 49 completely open.

When the driver starts up, the slide valve 47 leaves its position at the left of Fig. 2 or 4 and slides gradually towards the right under the thrust of the force X. The bolt can only engage in its housing 52 when the engine has definitely exceeded the speed of rotation $V^1$ for which the complete engagement of the clutch is obtained so that there is no change for the engagement during starting.

The engagement of the bolt 53 in its housing 52 brings into action a fourth force, namely the constant force Y due to the retaining action exerted by the bolt 53 on the slide valve 47 and which depends upon the power of the spring 54. This force Y is chosen in such a way that it is equal to the value $C^3F^3$ of the diagram of Fig. 3 and which corresponds to the value $V^3$ at which it is desired the declutching shall take place during the slowing down of the engine. This amounts to saying that for the return movement of the slide valve 47, under the effect of the slow-running of the engine, the parabola X is replaced by the parabola $X^a$ for which the ordinates have been increased to the value $C^3F^3$.

During the engagement of the bolt 53 the four forces which act on the slide valve 47 have their condition of equilibrium expressed by the relation $$X+P+Y=R$$

As a result thereof, for a speed of rotation V of the engine for which the centrifugal force X is equal to $VC^0$ and the retaining force Y equal to $C^0C^4$ the pressure of the oil can only be equal to $C^4F$. If the declutching speed of rotation $V^3$ has been chosen lower than that $V^2$ which determines the commencement of the engagement on starting and if the engine slows down and successively passes through the speeds of rotation $V^1$ and $V^2$, the slide valve 47 nevertheless remains at its position for which it closes the outlet 48 and thus prevents the disengagement of the clutch up to the moment when the speed of rotation $V^3$ is attained. The slide valve 47 is then freed from the bolt 53 and the conditions of operation regulated by the parabola X are again suddenly met with and the pressure of the oil rises abruptly to a value for which it is capable of developing on the slide valve 47 and thrust $C^3F^3$. This pressure assures the instantaneous and favourable disengagement since a pressure giving a thrust corresponding to $C^2F^2$ is only necessary to obtain this result.

The control devices described above can be completed by means permitting of obtaining a variable condition of engagement for the clutch, and by which it is therefore possible to modify, at will, the speeds of rotation $V^2$ and $V^1$ for example in order to be able, exceptionally, to make the engine rotate at a high speed for difficult starting conditions (sticking of the vehicle, starting on a very accentuated slope, etc.).

It may be desired, although this point is open to discussion, that the variation of the speeds of rotation $V^2$ and $V^1$ of the engagement of the clutch shall take place automatically according to the load of the engine, these speeds of rotation being lower when the engine is not loaded than when a considerable effort is required from it.

For this purpose, as shown on Figs. 1 and 2, there may be brought into action the suction which exists in the suction pipe of the engine by making it act through a conduit 62 on a diaphragm 63 accommodated in a chamber 64. The diaphragm 63 is connected to a rod 65 on which is arranged the spring 55 and which includes an abutment 66 by which the action of the said spring 55 on the slide valve 47 can be modified as a function of the momentary value of this suction. When the suction is a minimum (which corresponds to a heavy load of the engine), the diaphragm 63 is at the position shown on Fig. 2 for which the power of the spring 55 is added with a maximum value to that of the spring 51, which raises the speeds of rotation for affecting the clutch, as explained above. On the contrary, when the suction becomes greater, for light loads of the engine, the diaphragm 63 drives the rod 65 and the abutment 66 towards the right of Fig. 2, which diminishes or even eliminates the effort exerted by the supplementary spring 55 by lowering in this way the speeds of rotation for the clutching operations. If necessary the remote control 56—57 can intervene to modify or correct this automatic employment of the suction by more or less compressing the spring 55 through the intermediary of a sleeve 67 capable of sliding on the rod 65.

On Figs. 1 and 2 there is shown an arrangement comprising a cranked lever 68 pivoted to a lug 69 which extends from the slide valve 47. One arm of the lever 68 carries a roller 70 co-operating with a fixed rolling path 71 which has a step 72 in which the roller 70 can engage when the slide valve 47 comes to occupy a determined position and corresponding to a speed of rotation of the engine higher than $V^1$ as explained with regard to the retaining bolt 53 and the groove 52 of Fig. 4. This lever 68 is influenced by a spring 73 which bears against a member 74, for example carried by the lug 69, and which tends to apply the roller 70 on its rolling path 71, the calibrated power of the said spring 73 fixing the speed of rotation $V^3$ for disengagement. The lever 68 is also influenced by the rod 65, freely in contact with it and through the intermediary of which the spring 55 tends to apply the roller 70 on its rolling path with an intensity equal to that by which it reinforces the spring 51.

When the suction is very slight (full charge to the engine) the diaphragm 63 occupies the position shown on Fig. 2 and the main spring 51 as well as the auxiliary spring 55 are of full value. The speeds of rotation $V^2$ and $V^1$ of the engine, respectively determining the commencement and the completion of the engagement of the clutch have their maximum values. The spring 55, which applies the roller 70 on its rolling path, determines the speed of rotation $V^3$ for disengagement of the clutch when the said roller 70 has come to engage in the recess 72.

When the suction is greater (meagre charge to the engine) the diaphragm 63 is drawn in towards the right of Fig. 2, which consequently diminishes the action of the spring 55 and the reverse conditions are met with.

In two different ways there has therefore been introduced into the operation of the distributor G a new variable, that is to say the action of the suction materialising from the charging of the engine, in such a way that the operation of the clutch is regulated at the same time by two variable functional factors of the engine, that is to say its speed (governor 41) and its charge (suction).

Up to the present only the control of the servo-clutch, constructed according to the invention, has been considered, for the starting and slowing-down of the vehicle. But the clutch must also come into action, in the majority of cases, during the operations necessary for the speed changes for which, as indicated above, the operation of the clutch takes place under quite different conditions, that is to say that it must be rapid and no longer requires such a precise carrying out of the actions which produce and control its operation.

It is proposed to arrange the control of the servo-clutch during the changes of the speed gear combinations, in such a way that the engagement of the clutch B is lessened in the neighbourhood of the value corresponding to the couple actually transmitted at this moment by the engine to the driven mechanism and that this engagement is re-established, for example progressively and integrally, when the operation is terminated.

For this purpose there is made to intervene another distributor H but during the changes of the gear speed only. Advantageously, this supplementary distributor is arranged adjacent the distributor G in such a way that certain of the conduits or passages in which the oil circulates can be made common at least in part. In this way the distributor H is constantly branched on to the circuit of the oil under pressure by a pipe 75 connected to the delivery conduit 4 of the pump upstream of the outlet 48 supplying the distributor G. Also, the distributor H communicates with the discharge pipe 5 through a conduit 76.

The slide valve 77 of this distributor H generally occupies the position shown on Fig. 2, that is to say that utilized apart from the changes of the speed gears. In this case the slide valve 77 closes the outlet 90 for the oil under pressure and frees the passage 76 through which the return of the oil to the reservoir 1 takes place.

When the slide valve 77 occupies this position, it in no way modifies the automatic operation of the distributor G as explained above for it prevents the entry of the oil under pressure through the conduit 75 and does not hinder the return of the fluid which leaves the distributor G through the orifice 49, the passage 76 and the discharge pipe 5.

At the moment when the speed changes must be considered, the slide valve 47 of the distributor G has left the position shown on Fig. 2 and has been displaced towards the right in order to open the orifice 49 through which the discharge of the oil takes place and which corresponds to the engagement of the clutch.

When a change of speed is effected by means of a manual or automatic control which will be explained hereafter, the clutch B is disengaged through the exclusive intervention of the distributor H and this operation takes place at an instant when the speed of rotation of the engine is certainly higher than $V^3$ in such a way that the slide valve 47 of the distributor G is always at the position of engagement of the clutch, that is to say that the orifice 49 is open.

In order to operate the slide valve 77 at the required moment and in a determined direction, there must be brought into action the manual or automatic control of the gear box or boxes. For the examples shown on the drawings it has been supposed that this control also closes an electric contact 78 (Fig. 6) by which a coil 79 is connected, during each change of speed, by a wire 80 to a source of electricity 81, for example the storage battery of the vehicle. This coil 79 then attracts a plunger 82 integral with the slide valve 83 of a distributor K by which a pipe 84, proceeding from the suction pipe of the engine, can be put into communication through a pipe 85 with a chamber 86 containing a diaphragm 87 or a piston connected by a rod 88 to the slide valve 77 of the distributor H. A return spring 89 tends to return the slide valve 77 to its initial position shown on Fig. 2.

At the time of a change of speed gear the coil 79 is excited and instantaneously displaces the slide valve 83 in such a way that the diaphragm 87, under the effect of the suction, is urged towards the right of Fig. 2. It actuates the slide valve 77 the useful part $77^a$ of which opens the outlet 90 of the conduit 75 containing the oil under pressure and the useful part $77^b$ of which closes the inlet of the discharge passage 76. The oil under pressure can then pass from the conduit 75 through the chamber of the distributor H, through the orifice 49, through the chamber of the distributor G and through the conduit 15 in order at least partially to disengage the clutch B as explained above.

When the change of speed gear is terminated, the contact 78 (Fig. 6) is interrupted and the coil 79 frees the slide valve 83 which interrupts the action of the suction. The diaphragm 87 as well as the slide valve 77 return to their initial position (Fig. 2) under the action of the return spring 89, in such a way that the outlet 90 of the pressure conduit 75 is closed and that the discharge passage 76 is opened, the return of the oil taking place through the orifice 49. This immediately causes the re-engagement of the clutch.

Care is taken to give the useful parts $77^a$ and $77^b$ unequal surfaces in such a way that the pressure of the oil exerts an axial reaction on the slide valve 77 as explained with reference to the slide valve 47. This reaction renders the pressure of the oil variable, as a function of the effect of the suction on the diaphragm 87, and consequently as a function of this suction itself. In order that the thrust of the oil is exerted, for example, in the opposite direction to the action of the suction, the part $77^a$ is given a more reduced [suction] *section* than the part $77^b$.

If one disregards the effect of the spring 88, the action of which is only that of a simple return spring and which can be sufficiently weak so as not to intervene in the play of the forces present—contrary to what happens for the spring 51 of the slide valve 47 of the distributor G—, the equilibrium of the slide valve 77 can only take place when the thrust due to the pressure of the oil becomes equal to the action exerted by the suction on the diaphragm 87, which amounts to saying that the pressure of the oil varies in the same way as the suction.

Care is taken to dimension the various members, such as the slide valve 77 and the diaphragm 87, in such a way that the value of the pressure of the oil, corresponding to the maximum action of the suction (no charge), is equal to that which assures the complete disengagement, whilst that corresponding to the minimum suction (maximum charge) is zero (complete engagement). Under these conditions, the values of the thrust of the oil on the slide valve 77, therefore those of the pressure of this oil, exactly follow the values of the suction during the carrying out of the changes of speed gear, therefore finally the values of the engine couple, and the clutch is disengaged all the more as the couple transmitted at this instant is weaker.

There has therefore been realised very simply the condition of engagement of the clutch assuring a perfect smoothness of the changes of speed gear, since the engagement of the clutch can never be disproportionate with the couple actually to be transmitted at this instant and this in spite of the fact that this couple can take any value included between zero and the maximum couple.

By the dimensions given to the diaphragm 87 or the like and/or by a more or less intense action given to the spring 89 for the purpose of correction, it is possible to obtain at this moment, according to the particular characteristics it is desired to give to the construction contemplated, an engagement which may be "exact" or a little higher or again a little lower than the couple transmitted at the same instant.

It is advantageous for the return to normal operation to be carried out progressively. This can be obtained in various ways.

First of all it is possible to retard the return of the slide valve 83 of the distributor K to its obturating position by braking, through a small orifice 91, the outlet of the air contained in the chamber 92 formed in the distributor below this slide valve.

It is also possible to brake the return of the air into the chamber 86 for the diaphragm 87 by a small orifice 93 of regulatable section, for example by a pointed screw 94, which permits a very progressive return of the chamber 86 to atmospheric pressure. This return is accompanied (suction diminished until it becomes nullified) by a progressive reduction of the oil pressure which acts in the servo-clutch, and there results therefrom a very progressive engagement of the friction surfaces of the clutch, up to maximum engagement. One therefore returns very progressively from disengagement in proportion to the couple transmitted, to the complete engagement of the clutch.

The arrangement such as described can be utilised to obtain the operation of the transmission in "free wheel" by automatic disengagement of the clutch when the driver releases the pedal 95 of the accelerator in such a way that the vehicle is uncoupled from its engine which then rotates at "slow-running."

For this purpose there is provided, for example on the dashboard, a switch 96 which, when it is closed by an action by the driver, branches to the current source 81 a contact 97 provided on the accelerator pedal 95. When the pedal is completely raised, this contact 97 contacts a terminal 98 connected by a wire 99 to the coil 79 of the distributor K which causes the disengagement of the clutch, as explained above, as long as the pedal remains raised, the suction then being a maximum. As soon as the driver lowers the pedal, the energisation of the coil 79 is interrupted by 97—98 and the clutch B is again engaged. This operation "in free wheel" is only possible from the moment when the driver has voluuntarily closed the swtich 96 for when this latter is open the feeding of the coil 79 by the wire 99 becomes impossible.

The operation of the clutch during the changes of the speed gear can be effected more rapidly and under the best conditions when there is brought into action a synchronisation device which regulates the disengagement of the clutch in such a way that the engagement is made possible as soon as the members to be coupled in the variable speed gear box or boxes have attained substantially equal angular speeds. This intervention corresponds practically to the automatic realisation of the operation called "double declutching" and which some drivers carry out during the changes of the speed gear and more especially during the passage to a lower gear combination. It is known that this operation consists, after having separated the members of the speed gear box which give the ratio previously utilised, in accelerating the engine in an endeavour to give it as accurately as possible the speed it will have with the new ratio, which allows, at this instant, the engaging, without difficulty, the members which give this new ratio.

For boxes with friction clutches the difficulties of engagement are not so considerable as for boxes with engageable gears, but synchronisation is nevertheless advantageous so that the operation can take place as rapidly as possible and to prevent the friction surfaces to be coupled from slipping or causing jerks in the transmission when the clutch B is prematurely engaged.

Such a synchronising device can be constituted as follows and as shown in detail on Fig. 8.

In the neighborhood of the distributor assembly G and H there is made to terminate a shaft 100 driven according to any ratio M by the engine and for example through the intermediary of a belt transmission 101. This shaft 100 can therefore be that of the lighting dynamo. On the extension of the said shaft 100 is located a shaft 102 connected, by a ratio slightly lower than M and for example 0.98 x M to the input shaft 11 of the speed gear box or boxes, for example by a worm drive 103 and a flexible connection 104.

One of these shafts, for example 102, carries a screw 105 with rather rapid threads, preferably of triangular section, and of desired hand. The other shaft 100 carries a casing 106, the interior length of which is greater than that of the screw 105 and which is capable of sliding on the shaft 100 and being driven in rotation by this latter. It carries in an aperture in its periphery, a part giving a drive limited by contact with the threads of the screw 105, for example a ball 107 held forced between these threads by a spring 108. If the two shafts rotate in the direction indicated by the arrows on Fig. 2 and if the thread of the screw 105 is right handed, the device functions as follows.

If the shaft of the engine A and the input shaft 11 rotate at the same speed (normal running of the vehicle) the shaft 102 rotates at 2% less quickly than the shaft 100 in consequence of the ratio adopted. The ball 107 plays the part of a nut thread with respect to the threads of the screw 105 in such a way that the casing 106 acts as a nut but with limited action due to the spring 108. This actuation makes it occupy its extreme position towards the left of Fig. 2, at which it is stopped. The ball 107 therefore can no longer follow the threads of the screw and jumps from one to the other, by clearing their projection and each time compressing the spring 108 to a degree which, in this case, is 2% of the speed of the engine.

There is located in the casing 106 an exterior groove 109 in which is engaged a fork 110, guided, for example, by a rod 111 and terminating in a push-bar 112 located opposite a projection 113 which extends from the slide valve 77 of the distributor H. In the position shown on Figs. 1 and 2, this push-bar is not in contact with the projection 113.

If an examination is made of what happens when, for a change of speed gear one passes to a lower combination (changing down) it is seen that in consequence of the change of ratio and of the "exact" disengagement of the clutch as explained above, the input shaft 11 of the speed box suddenly takes a greater speed. The engine A cannot follow this variation of speed since the "exactly" engaged clutch leaves it with the load of the couple which it produces at this moment. If matters remained in this state, the difference of speed of rotation between the input shaft 11 and the engine A, therefore between the shafts 102 and 100 would be maintained until the progressive re-engagement of the clutch makes it disappear.

But as soon as this difference of speed has exceeded the value of 2% that is to say practically as soon as the shaft 102 turns more quickly than the shaft 100, the ball 107 under the action of the threads of the screw 105 drives the cage 106 towards the right of Fig. 2. After which, not being able to go further, it again begins to jump over the threads of the screw 105, while remaining under their influence. In its movement the casing draws along the fork 110 and the push-bar 112 which positively forces the slide valve 77 back towards its position of complete declutching whatever may be at this moment the value of the suction acting on the diaphragm 87 or the like, the power of the spring 108 being at least equal to that of the maximum action to be provided for this suction.

The clutch B is therefore completely disengaged as soon as the input shaft 11 has taken up a speed of rotation higher by more than 2% than that of the engine. If the carburetor is only slightly open at this moment the engine, freed from any load by this operation, at once accelerates. All its available power is utilized for this acceleration which can consequently be instantaneous and thus constitutes a gain of time for the change of the speed gear. As soon as the speed has become such that it is now only at 2% below that of the input shaft 11, the screw 105 and the casing 106 have the same speed of rotation and the casing returns to the position shown on Fig. 2 for which its action on the distributor H ceases. The clutch is immediately re-engaged at the value of the couple transmitted (suction only) then progressively in entirety. On the commencement of the engagement it can be said that the friction surfaces are in synchronism for the difference in speed of rotation of 2% is compensated by the time necessary for the carrying out of the operation however rapid it may be.

By the means indicated the clutch has therefore been almost completely prevented from slipping under load, since the complete disengagement was obtained as soon as a difference in speed of rotation of 2% was established between the friction linings and that re-engagement was produced as soon as the difference of speed of rotation fell below 2%. Moreover the duration of the disengagement of the friction parts is necessarily accurate since it is precisely the difference of speed of rotation of the friction surfaces which produces it and makes it cease.

In order to be sure that the time required by the operation shall be the minimum, it is sufficient to facilitate the acceleration of the engine during the disengagement of the clutch. For this, there can be arranged, in the neighbourhood of the controlling arm 114 (Fig. 1) of the throttle of the carburetor or in any other favourable position of the rod which controls this arm, a lever 115 coaxial to the arm 114 and which is adapted to act, for example by an adjustable projection 116, on the arm 114 in order to increase the opening of the throttle. The lever 115 is connected, for movement by the fork 112 for example by being connected by a rod 117 to the guide rod 111 of this latter.

Of course this temporary opening of the throttle of the carburetor during synchronisation could be obtained by other means than those indicated above.

In the foregoing it has been supposed that the distributor K (of the suction) comes into action for each change of the speed gear, whether it be rising or falling, whilst the synchroniser 106 only comes into action for passages to a lower combination. On Fig. 7 there has been shown an arrangement for which the effect of the suction, regulated by the distributor K, only acts for the rising changes of the speeds whilst the control of the clutch B, during the falling changes of the speeds, is regulated only by the synchroniser 106 but this time without the intervention of the suction at the time of engagement.

The control mechanism of the speed gear box and which will be described more explicitly hereafter, produces by its displacements in the direction for which one passes to a higher speed combination, the closing of the contacts 78 and 78[a] which conduct the current through the wire 80 to the coil 79 of the distributor K. For all the rising changes there will therefore be obtained the operation of the slide valve 77 of the distributor K with intervention of the suction as explained above.

When the control mechanism is acted upon in order to pass to a lower speed combination there is obtained the closing of the contacts 78 and 78[1] which, by a wire 80[1], conduct the current to an interrupter 118. This latter, which is normally open, can be closed by the rod 111 of the synchroniser 106 as soon as, in consequence of a falling speed gear change, the shaft 102 turns more than 2% more quickly than the shaft 100. At this moment the interrupter 118 energises a coil 79[1] in which is accommodated a plunger 82[1] which carries a push-bar 119 with guiding rod 120 and which is capable of forcing the projection 113 of the slide valve 77 of the distributor H towards a position for which the disengagement of the clutch B is obtained. This displacement is made possible owing to the lost-motion connection 121 provided between the slide valve 77 and the rod 88 controlled by the effect of the suction.

By the closing of the contact 78[1] the coil 79[1] is energised and instantaneously attracts the plunger 82[1] which forces the slide valve 77 towards its declutching position. At this moment there comes into action the synchroniser 106 which maintains the contact 118 closed as long as the shafts 100 and 102 do not turn in synchronism and which opens the contact 118 by displacement of the casing 106 and of the rod 111 towards the left of Fig. 7 as soon as synchronism is attained, as explained above. The energisation of the coil ceases and the plunger 82[1] returns to its inactive position under the action of its return spring. The slide valve 77 of the distributor H follows this movement, by being pressed by its spring 89, which permits the engagement of the clutch B.

Moreover, it is possible, if one is satisfied with an approximate synchronisation, to simplify the mechanism a great deal. The wire 80[1] is then connected directly to the winding 79[1], entirely eliminating the contact 118 and the synchroniser 106.

In this way the current sent by the contact 78[a] arrives directly to actuate the plunger 82[1] every time a falling speed gear change takes place and thus causes the complete disengagement of the clutch. In this case it is advantageous to regulate the period during which the disengagement of the clutch takes place and for this purpose there can be provided on a part integral in movement with the plunger 82[1], for example on its guide rod 120, a dash-pot 122 whose action is regulatable by the needle valve 123 and which brakes the return movement of the plunger 82[1] and in consequence of the slide valve 77 under the action of their respective return springs.

It is also expedient to observe that one could very well omit the distributor K and permanently connect the chamber 86 having the diaphragm 87 or the like by conduit 85 (Fig. 4) to the suction piping of the engine, while regulating, however, the various control members so that the engagement always maintains an appreciable security with respect to the couple transmitted by the clutch. In this case the engagement of the clutch would be permanently variable as a function of the engine couple and would therefore be constantly regulated as at the time of changes of speed gear, which does not present any disadvantage in itself so long as the security of engagement is sufficient. But undue wear of the clutch abutment may result therefrom, if special precautions are not taken with a view to its proper preservation and particularly regarding its lubrication.

There has been described above in detail and by way of example a change-speed mechanism with a reversing device C and two planetary gear boxes D and E with oil servo-motors 31—34 and separate distributors D[1] and E[1].

First of all there will be shown how the semi-automatic operation of this mechanism can be arranged, that is to say that for which the driver decides and causes the changes of the speed gear combinations without furnishing the effort necessary for the operations and, of course, without acting on the clutch B of which the control and the operation can be, at any rate, made automatic as explained above.

It is readily remembered that the direct drive for each gear box D or E is obtained when the sliding plate 27 is made integral by its conical rim 28[a] with the planetary gear 23, which is obtained when the pressure does not act in the servo-motor 31—34 of this box, and that the drive takes place at a reduced speed when the said plate is immobilised by the braking of the conical rim 28[b] on a fixed rim 30 and for this purpose the pressure must act in the said servo-motor 31—34.

Under these condtions and assuming that the lower gear of the box D gives a ratio lower than that of the lower gear of the box E, the four speeds for the assembly are obtained in the following manner.

First speed: Box D under pressure—box E under pressure.

Second speed: Box D under pressure—box E in discharge.

Third speed: Box D in discharge—box E under pressure.

Fourth speed: Box D in discharge—box E in discharge.

The suitable distribution of the pressures or discharges is obtained by an appropriate operation of the distributors D[1] and E[1] the slide valves of which are connected respectively by remote controls, for example flexible members 132 and 133, to a control device located within reach of the driver's hand and for example on the steering column 133[1] or on the dashboard.

Figure 6:
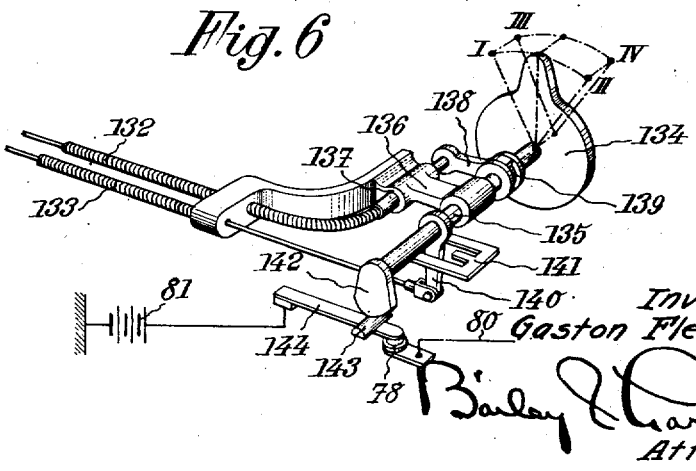
Fig. 6 shows, in perspective, a control device for the gear box forming part of the transmission according to Fig. 1.

The details of a control device of this kind are clearly shown on Fig. 6. It comprises a knob 134 the axle 135 of which is capable of sliding and of turning in its support 136 and to which the driver can give four active positions I, II, III and IV arranged for example as is standard for automobiles. In the case considered above for the distribution of the pressures, the free extremity of the flexible member 132 of the distributor D[1] of the box D is engaged in a guide 137 in such a way that it can slide in the said guide parallel to the axle 135 of the knob 134 and this free extremity is connected to a fork 138 engaged in a peripheral groove 139 of the axle 135. As a result thereof when the knob 134 is acted upon by pull or push the driving of the flexible member 132 and of the slide valve D[1] corresponds thereto.

The flexible member 133 of the distributor E[1] is connected to a finger 140 keyed on the axle 135 and which is advantageously guided by a gate 141 commonly used in automobiles in such a way that the useful positions of the axle 135 can be easily determined in the course of the operations of the knob 134. When this latter is displaced angularly in one direction or the other there is driven at the same time the flexible member 133 and with it the distributor E[1].

It will easily be proved that by placing the knob 134 successively in the four useful positions I, II, III and IV there is obtained the correct distribution of the pressures and discharges in the assembly of the two boxes D and E.

The control member 134 can be given the form of a knob on account of the very small efforts necessary for the displacement of the slide valves —preferably balanced—of the distributors D and E[1]. There is advantageously provided on the knob 134 a projection which constitutes an indicator for the driver as to the exact position given to the knob and that even in the dark, to avoid any wrong operation.

On the axle 135 of the knob 134 there is also mounted a cam 142 which can act on an insulating member 143 carried by an insulated metallic blade 144 connected to the source of electricity 81. This blade 144 forms part of the switch 78 connected by the wire 80 to the coil 79 of the distributor K (Fig. 2). The member 143 has been given sufficient dimensions so that the cam remains in contact therewith during the axial or angular displacements of the axle 135 but that this contact ceases as soon as the knob occupies any one of its useful positions. It results therefrom that the coil 79 of the distributor K is only energised during the operations of the knob 134 to cause a change of the speed gear combinations but ceases as soon as these operatons are terminated, which corresponds in full to the operation indicated for the distributor K.

For this purpose, as shown in Fig. 4, the slide valve 47 can be influenced by a supplementary spring 55 acting in the same direction as the spring 51 and the power of which can be modified at will by a lever 56 remotely-controlled by the driver with the aid of a flexible member 57 and a draw knob 58 for example.

In the case where it is desired to be able to modify in this way only the speeds of rotation $V^1$ and $V^2$ but not the speed of rotation $V^3$, the spring 55 is made to act on a lever 59 articulated on the one hand to the slide valve 47 and on the other hand to a rod 60 which, by a cranked lever 61, acts on the bolt 53 in order to apply to it a fraction of the action of the spring 55. It is thus possible to increase, by equal amounts for example, the action R of the spring 51 and the action Y of the bolt 53.

The diagram of Fig. 3 shows the result obtained. It is supposed that by the intervention of the spring 55 the action R of the spring 51 has been transferred to $R^1$ and that of the bolt 53 from $C^3F^3$ to $C^3F^{3a}$. The point corresponding to the commencement of the engagement of the clutch is then transferred to $C^{2a}$ for the speed of rotation $V^{2a}$ to the same distance under the horizontal $R^1$ as $V^2$ was under the horizontal R. The point corresponding to the completion of the engagement is transferred to $C^{1a}$ at the intersection of the horizontal $R^1$ with the parabola X for a speed of rotation $V^{1a}$.

The action of the bolt 53 having been increased, there must be considered for the action of the forces a new parabola $X^b$ which intersects the horizontal $R^1$ at $F^{3a}$. It is discovered that the speed of rotation $V^3$ for declutching has not been modified. The points of the commencement ($V^{2a}$) and of the completion of the engagement ($V^{1a}$) at the time of starting have thus been displaced without modifying the point of disengagement ($V^3$) at the time of slowing-down which is rational in order not to reduce the utilisation of the engine at low speeds of rotation.

If it had been desired also to modify the point of disengagement ($V^3$) it would have been sufficient to change the distribution of the action of the spring 55 on the slide valve 47 and on the bolt 53, for example by adopting a lever 59 with unequal arms. This would be indicated for example in the case where the carburetor of the engine comprises a "starter" device facilitating starting from cold, but which modifies, rather substantially, the slow-running speed of the engine by raising its speed. By combining the control of the "starter" with the control 57 of the spring 55 it is possible to cause to vary the condition or conditions of engagement and/or of disengagement in dependence as the slow-running condition of the engine varies.

The action of the suction acting permanently as engagement reducer when the transmitted couple diminishes is very advantageous when it exerts itself on the slide valve of a simple distributor such as those designated by G and H on Figs. 1, 2 and 4, but this action is not limited to this mode of operation.

Figure 5:
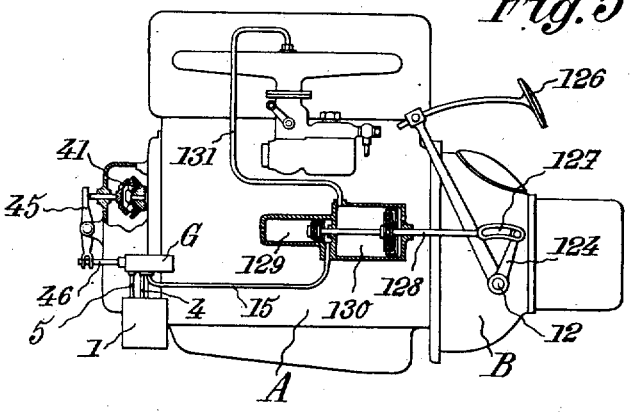
Fig. 5 shows, in elevation (parts in section) another variation of a controlling and operating mechanism of a clutch of the transmission according to Fig. 1.

Fig. 5 shows an arrangement which permits of obtaining the result to which reference has just been made, that is to say the elimination of the distributor H and of its controlling members such as K and $79^1$. In this case the clutch B is operated by an arm 124 keyed on the shaft 12 carrying the ordinary pedal 126. On this arm there is made to act, through the intermediary of a lost motion device 127, a rod 128 controlled by two servo-motors 129 and 130 one of which (129) functions in the manner of the oil servo-clutch 14–17 of Figs. 1 and 2 and is connected for this purpose by a conduit 15 to the distributor G. The other servo-motor (130), of larger dimensions, operates by suction by being connected by the pipe 131 to the suction conduit of the engine. It is mounted for example in tandem with this latter, in order to assure the disengagement of the clutch B. The surface of the suction piston is calculated, with respect to the effort necessary for the operation of the clutch, like that of the diaphragm 87 of Figs. 1, 2 and 4, account being taken of the reaction of the oil acting in the servo-motor 129.

For the example according to Fig. 5 the oil servomotor 129 is controlled only by the distributor G in dependence upon the centrifugal governor 41 in such a way that the servo-clutch only comes into action for the starting and slowing down of the vehicle. Of course this assembly could be completed by a distributor H functioning as explained with reference to Figs. 1, 2 and 4 or Fig. 7.

The suction servo-motor 130 can remain in permanent connection with the suction pipe of the engine and in this case, as its action tends to disengage the clutch when the suction increases, the engagement constantly follows the variations of the couple transmitted and it is advantageous to make special arrangements with regard to the clutch abutment; that is to say that the result is the same as that obtained by the arrangement according to Fig. 4 when a distributor K is not utilised for the suction. There can also be provided in the pipe 131, located between the servo-motor 130 and the suction pipe of the engine, a distributor similar to that designed by K on Figs. 1 and 2 and there is then again found the same result as that obtained by the complete device shown on these figures.

It should be observed that the suction can be influenced not only by the engine couple but also by the variations of the atmospheric pressure (altitude, bad weather, etc.). These influences are not, however, sufficiently important to be able to disturb the operation of the devices described above except in quite exceptional circumstances.

It should not be thought that the clutch controls which have just been described under various forms, are only applicable to planetary gear boxes with frictional engagement, particularly that described in detail with reference to Fig. 1. It can also be utilised for any other gear box, for example with sliding gears or with coupling by dog-clutches.

This follows in itself as regards the startings and slowing-down of the vehicle, the gear box not being concerned at these instants. But this is true also for the speed gear changes, with the sole condition that care is taken during these operations, to supply with electricity the coil 79 of the distributor K and/or the coil 79[1] of the arrangement according to Fig. 7.

The device described can then be utilised without any modification. In effect, at the moment of a speed change with a gear box, the driver releases the accelerator pedal in order to change speed. This action carries the suction to its maximum value, and instantaneously the complete disengagement of the clutch takes place.

But in the case considered, as the driver is always compelled to release the accelerator, partial disengagements become superfluous and the electromagnet 79—82 can be made to act directly on the slide valve 77 and the suction apparatus 86 be eliminated, this electromagnet being energised and explained by the contact 78 associated with the operating member of the speed change. In this particular case the slide valve of the distributor H must no longer be of different area since the pressure of the oil is utilised entirely for the complete disengagement or is omitted in order to obtain normal engagement.

Figure 7:
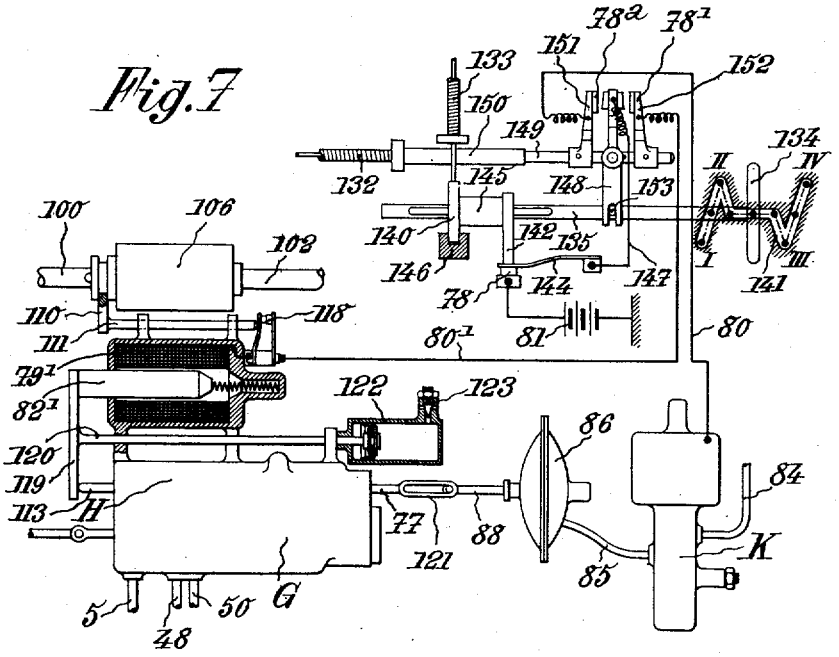
Fig. 7 shows in elevation a control device of the gear box with concomitant operation of the clutch, this device being constructed in a different manner from that of Figs. 1 and 6.

In order to obtain the particular operation of the device shown in plan on Fig. 7 for which there is provided a distributor K set apart for the control of the clutch B during the changing up of the speeds and a special coil 79[1] for this control during the changing down of the speeds, there must be provided for the knob 134 a more complex movement between these useful positions I, II, III and IV. In this case the knob 134 is always connected to the sliding axle 135 on which is engaged by a long keyway a sleeve 145 which therefore turns with the said axle but is prevented from moving axially by a fixed part 146. This sleeve 145 carries the finger 140, to which is connected the flexible member 133 of the distributor E[1], as well as the cam 142 which controls the switch 78. This switch is connected by a wire 147 to one conducting and insulated extremity of an oscillating lever 148 articulated at its centre to a rod 149 connected to the flexible member 132 of the distributor D[1] and axially guided by a fixed part 150. On both sides of the conducting extremity and at a certain distance from this latter there are provided arms 151 and 152 keyed on the rod 149. The conducting extremities of these arms carry respectively the terminals 78[a] and 78[1] connected respectively by the wires 80 and 80[1] to the coils 79 and 79[1] the function of which has been explained above. The other extremity of the lever 148 is engaged with a pin 153 mounted on the axle 135. The slots of the gate 141 are arranged obliquely in such a way as to compel the knob 134 to perform oblique and axial movements so as to pass from one useful position to another. This guiding is such that for changing up, that is to say from the positions I to II, II to III, III to IV, the knob 134 and the axle 135 are always moved in the same direction from left to right of Fig. 7. For each of these movements there is first of all obtained a sliding of the axle 135 and an inclination of the lever 148 until its conducting extremity comes into contact with the terminal 151 to feed this latter and it is only after this contact that the rod 149 and the flexible member 132 are driven through the intermediary of the arm 151 to act on the distributor D[1]. The angular movement of the knob 134 causes, as for the example according to Fig. 6, the control of the flexible member 133 and of the slide valve E[1].

On the other hand, for changing down, the movements IV—III, III—II, II—I of the knob 134 all take place in opposite direction and in this case the conducting extremity of the lever 148 comes each time into contact with the terminal 78[1], which energises the coil 79[1] whilst the rod 149 and the flexible member 132 are moved axially through the intermediary of the lever 148 and of the arm 152.

When the action on the knob 134 ceases the lever 148 returns to its inactive middle position, which interrupts the energising of the coil 79 or 79[1]. But, moreover, the distribution of the current is regulated through the intermediary of the cam 142 and of the interrupter 78[1] which accompany the speed gear changes. The current is always interrupted when these latter are terminated and when the knob 134 has arrived at one of its positions of normal use.

Moreover care is taken to give the slide valve of the distributor D[1] which controls the simple gear box D such a form that the supplemental movement which is thus imparted thereto between the positions I—II and III—IV of the control member 135 is without effect on the distribution, this latter only passing from supply under pressure to discharge between the points II and III and inversely.

Figure 8:
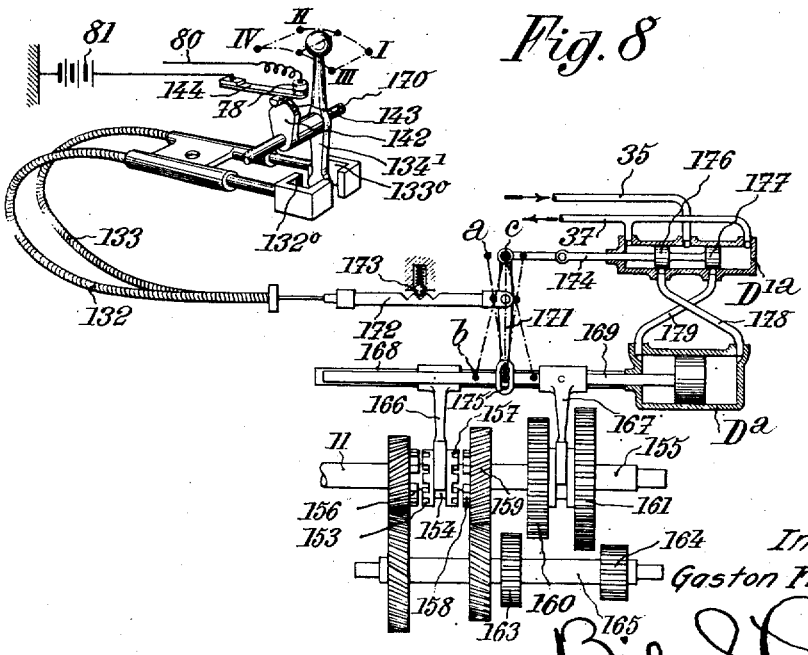
Fig. 8 shows in diagrammatic section a device for the control and the operation of a gear box of a type different from that shown on Fig. 1.

The invention is in no way limited to the special planetary gear boxes D and E shown by way of example but is also applicable to gear boxes of any kind such as the sliding gear box, of a standard type, shown on Fig. 8.

Direct drive is obtained by the engagement of the sliding dogs 153 of a ring 154, sliding with a long keyway on the shaft 155 which extends from the gear box to drive the wheels of the vehicle, with sliding dogs 156 integral with the input shaft 11 of the box. The third speed is obtained when the sliding dogs 157 are engaged with the sliding dogs 158 carried by a pinion 159 mounted loosely on the shaft 155. The second and first speed are respectively obtained by the meshing of the sliding wheels 160 and 161 engaged on the intermediate shaft 162 with the wheels 163 or 164 integral with the intermediate shaft 165.

These movements are respectively obtained by the axial sliding of the forks 166 for the speeds III and IV and 167 for the speeds I and II.

It is proposed to produce the movement of these forks by the hydraulic device already described and that under the control of an operating member, such as a hand lever 134[1], provided within reach of the hand of the driver. For this purpose the movement of each fork is subjected by an appropriate small servo-motor to the movement imposed by the driver on the distributor of the servo-motor concerned.

The fork 167 is controlled for example by the small servo-motor D[a] the piston of which is connected to this fork by a rod 169.

The fork 166 is controlled by a small servo-motor similar to that designated by D[a] and by a rod 168.

In order to control a distributor D[1a] for the servo-motor D[a] and that of the second servo-motor recourse is had to an operating member constituted, for example, by the hand lever 134[1] and which controls the two distributors through the intermediary of two separate controls such as flexible members 132 and 133. On the side of the hand lever these flexible members, suitably guided, respectively present driving notches 132° and 133° in each of which the hand lever 134¹, capable of sliding on its axis 170 and of turning around this latter, can be engaged in order to assure the driving of the corresponding flexible member. When the free extremity of the hand lever occupies one of its active positions I, II, III and IV, the distributors of the servo-motors such as $D^a$ are brought to a position for which there is obtained the bringing into action of the new speed combination.

The extremity of each of the flexible members 132 or 133 is not directly attached to the slide valve of the corresponding distributor but actually through the intermediary of a lever 171 to which there is articulated, at an intermediate point, a rigid rod 172 which prolongs the said flexible member. A ball 173, influenced by a spring and co-operating with notches provided in the rod 172, holds this latter in each of its exact useful positions to which it is brought by the hand-lever 134¹. One extremity of the lever 171 is articulated to the spindle 174 of the slide valve and the other is engaged, through the intermediary for example of an elongated eye 175 on a pin carried by the rod (169) of the corresponding servo-motor. In this way the distributor of each servo-motor is compelled to follow, with an exact amplitude, the displacements imposed thereon by the control member 134¹ while being also subjected to the influence of the reactions of the piston of the servo-motor in the course of its operation.

The slide valve of each distributor comprises two obturating parts 176 and 177 sufficiently spaced apart so that the outlet of the circuit 35 conducting the oil under pressure, is never obturated by one or the other of these obturating parts. At the middle position of the slide valve, it obturates, however, at the same time the two passages 178 and 179 connecting the distributor to the two covers of the cylinder of the servo-motor ($D^a$). The two extremities of the body of the distributor ($D^{1a}$) are constantly in communication with the discharge conduit 37.

It is assumed that the driver, by acting on the hand lever 134¹, has moved the lever 171 by the flexible member 132 in such a way that its upper extremity comes to occupy the position *a*. In this case the slide valve of the distributor $D^{1a}$ is driven towards the left of Fig. 8 and the oil under pressure passes through the conduit 35, the middle space of the distributor and the passage 178 in order to act on the right-hand face of the piston of the servo-motor $D^a$. The other face of the said piston is subjected to the discharge pressure through the passage 179, the right-hand space of the distributor and the conduit 37. The piston is set into movement and drives not only the fork 167 but also the lever 171 which pivots around the extremity of the rod 172. As a result thereof the slide valve of the distributor is moved towards the right of Fig. 8.

If the point of articulation of the rod 172 to the lever 171 is located at the middle of this latter, the movement of the piston is equal but in the opposite direction to that of the slide valve of the distributor but if, as shown on Fig. 8, the point of connection is located nearer to the distributor, the amplitude of the displacement of the slide valve will be less than that of the piston. Consequently, when the piston arrives at its position *b*, the lever has restored, for example, the slide valve to its neutral position *c* and the servo-motor stops. At this moment the speed gear change has been effected. It results from the foregoing that the driver decides and causes the operation of the slide valve of the distributor in a determined direction, but that he need not intervene at the end of the operation of the speed gear change to restore the distributor to its initial neutral position, this action being performed by the servo-motor itself when the operation is actually finished.

It could easily be provided that by the action of the hand lever 134¹ or the like on the two distributors it is possible to obtain at will the substitution of the desired speed change for that it is desired to abandon, and as the efforts to be exerted on the slide valves of the distributors are very slight, the hand lever 134¹ or the like can have very reduced dimensions so that it can be located in any desired position and which is easily accessible to the driver.

The invention can also be applied in the case where it is desired that the control is entirely automatic and regulates not only the operation of the clutch device B but also that of the speed gear box or boxes whatever may be the constitution of these latter. It has been shown above that for the operation of the speed change (with the exception of the reversing mechanism) it is sufficient in all cases to distribute in the servo-motor associated with each of the boxes a fluid (oil) under pressure or to eliminate, at least in part, the effect of this pressure in order to obtain the desired result. For the preceding examples there are interposed, for this purpose, distributors the slide valves of which are controlled from a distance and without difficulty by the driver in such a way as thus to obtain a semi-automatic control of the speed change.

It is now proposed to control the distribution of the fluids under pressure or in discharge by entirely automatic means. For this purpose the slide valves of the distributors $D^1$ and $E^1$ of the preceding examples can be combined into a single part 180 (Fig. 9) in which, in the case where it is a question of the operation of two coupled gear boxes of the kind of those shown on Fig. 1, four series of peripheral channels are provided, the forms of which are clearly visible on Figs. $9^a$, $9^b$, $9^c$ and $9^d$. These channels are spaced over a part of the length of the slide valve 180 in such a way that they can be brought successively opposite the conduits, in which is located the oil under pressure or in discharge, by an axial movement of the slide valve 180.

The useful positions of the slide valve 180 are determined by a retaining device constituted for example by a ball 181, influenced by a spring and co-operating with notches 182 provided in the slide valve.

Besides the distributor N which controls automatically and for example two distinct gear boxes D and E as for the preceding embodiments, it should be understood that there is interposed a distributor G for the automatic control of the clutch B during starting and slowing-down and a distributor H for the automatic control of the same clutch during the changes of the speed gear combinations.

As for the example shown on Figs. 1 and 2, the oil under pressure is supplied through the conduit 4 and is brought, on the one hand, to the distributor G by the outlet 48 and on the other hand to the distributor N by the conduit 35. The discharge of the oil, proceeding from the distributor G takes place through the discharge pipe 5 and that proceeding from the distributor N through the pipe 37. The distributor N is connected to the servo-motors of the gear boxes D and E respectively through the conduits 39 and 36 and the distributor G is connected to the clutch B through the conduit 15.

In order to control the slide valve 180 of the distributor N it is possible to utilise one or several functional factors of the engine or of the vehicle for example the speed of the driving or driven shaft obtained from a centrifugal governor driven by this shaft, the load on the engine which would then be taken off from a dynamometer or by a deformable member (diaphragm) or movable member (piston) on which the suction of the engine acts, or any other appropriate functional factor.

Figure 9:
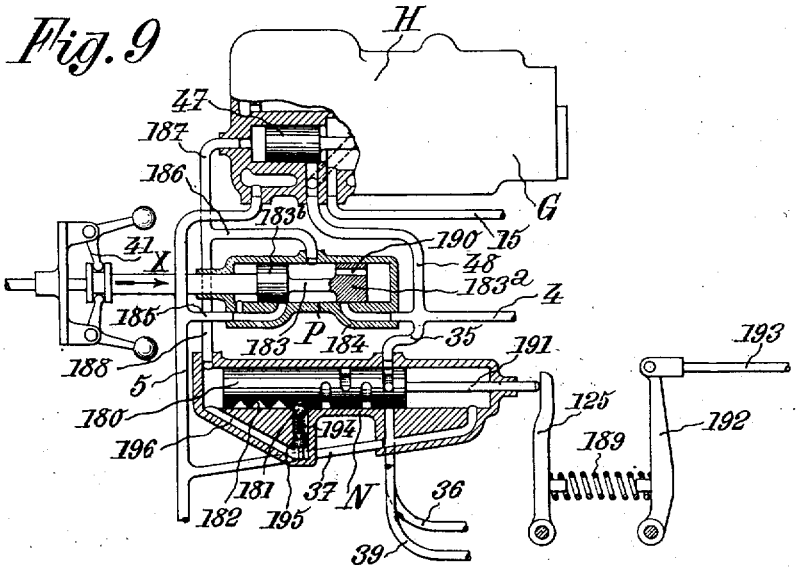
Fig. 9 shows in vertical section, a control device constructed according to the invention, for an entirely automatic transmission.

For the example shown on Fig. 9 it has been assumed that this distributor N is controlled by a governor driven by the engine shaft. This governor could be distinct from that (41) which acts on the distributor of the clutch or it can be combined with this latter. In this case it is necessary suitably to distribute the action of this single governor 41 to the slide valve 47 of the distributor G and to the slide valve 180 of the distributor N so that the interventions of these two distributors cannot mutually interfere, that is to say that the slide valve 47 only occupies certain useful positions for the speeds of rotation $V^2$ (disengagement) $V^1$ (engagement) or even $V^3$ (declutching) of the engine which only affect the clutch B during the startings and slowing-down of the vehicle whilst the slide valve 180 comes into action advantageously according to the speed of rotation $V^1$ only, for which the clutch B is completely engaged.

This distribution of the action of the governor 41 could be obtained by mechanical means, for example by a swing bar transferring on to the distributors concerned the effect of the governor 41. However in this case the governor must be given a greater power or stroke, which may complicate the construction.

Recourse may also be had, as shown on Fig. 9, to a proportioning distributor P, appointed to assure, in an accessory circuit, an oil pressure which follows the variations of the centrifugal force of the governor. It is the oil of this circuit at "centrifugal pressure" which is then distributed in such a way as to act on the movable parts of the various distributors in the same way as the governor would directly, for example through the intermediary of the swing-bars.

For this the distributor P is arranged like the distributor H of Fig. 2; it has an inlet 184 for oil under pressure supplied through the delivery conduit 4 of the pump 2, an oil outlet 185, the slide valve 183 closing these two passages at its middle position by its obturating parts $183^a$ and $183^b$. The pipe 186 is never covered by these obturating parts. The governor acts directly on the slide valve 183 and in order to create the reaction of the oil which renders its pressure proportional to the action X of the governor an opening 190 is bored for example in the obturating part $183^a$. In this way there is utilised, in order to create the thrust action of the oil, no longer the difference of section of the two obturating parts of the slide valve but the total section of the obturating part $183^b$. The piston $183^b$ could quite as well be given a greater diameter than that of the piston $183^a$ as for the preceding examples.

This mechanism creates an axial thrust similar to that which has already been explained at the time of the description of a slide valve with obturating parts of different diameter and this thrust always being equal to the action of the governor 41, the oil pressure from the distributing circuit 186 follows the variations of the centrifugal force. This circuit 186 is appointed to distribute this pressure on the end of the slide valves of the distributors G and N in such a way that these latter receive, by this centrifugal pressure, actions which are proportional to those they received directly or indirectly from the governor as for the preceding examples. The proportion is regulated by the ratios of the diameters of the slide valves 47 and 180 to that of the slide valve 183.

For the distributor 180, appointed to control the speed changes, it is necessary to oppose to the action of the oil "at centrifugal pressure" supplied by the by-pass 188 a variable resistance, particularly by causing to act on a spindle 191 of the slide valve 180 an opposing spring 189 the stress of which can be modified, at will, by the driver through the intermediary of a remote control such as a lever 192 on which the driver can act through the intermediary of a rod 193.

The spring 189 could act directly on the stem 191 of the slide valve. But being given the rather considerable stroke of this part, its length would have to be very great if it is desired that this later shall not have a great influence on its power.

It is preferable, in order to diminish the extension of the spring 189 and, in consequence, its length, to make it act on a lever 125, articulated to a fixed point and receiving the action of the spring on a relatively small lever arm in order to transmit it to the stem 191 by a lever arm which is clearly larger.

For the automatic control the ball 181 does not play only the part of a simple holding device. The retaining force which it exerts must advantageously be variable either with the thrust of the oil acting on the slide valve 180, or with that of the opposing spring 189. For this purpose there is made to act on the spring 194, which determines the effort transmitted by this ball, a small piston 195 located in a conduit 196 branched on the by-pass 188 through which the oil under pressure is brought to the distributor N.

Figures 9A, 9B, 9C, 9D:
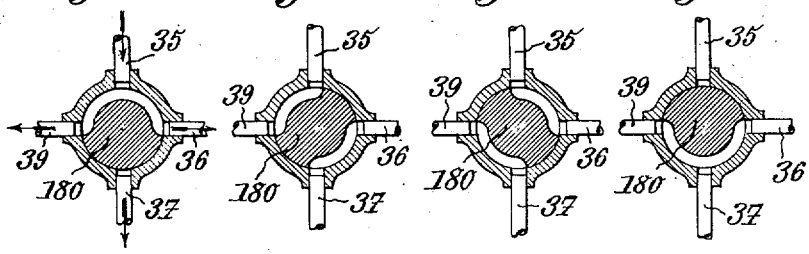
Figs. 9a, 9b, 9c and 9d show, in transverse section, respectively four characteristic positions of a distributor forming part of the device according to Fig. 9.

The device thus constituted operates as follows. When the governor 41, driven by the engine, develops a centrifugal force corresponding to the speed of rotation $V^2$ of the engine, the slide valve 183 has come to occupy a position for which the outlet 184 for the oil under pressure is uncovered and the pressure acts through the middle space of the distributor, through the passage 186 and through the by-passes 187 and 188, on the slide valves 47 and 180 of the distributors G and N. By the action of the forces acting on the slide valve 183 this pressure increases, as stated above, with the momentary value of the centrifugal force. Between the speeds of rotation $V^2$ and $V^1$ of the engine, as explained at the beginning, the engagement of the clutch takes place whilst the slide valve 180 of the distributor N always occupies the position, shown on Fig. 9, for which the engagement of the first speed is obtained. As indicated with reference to the operation of the gear boxes D and E shown on Fig. 1, it has been supposed that in this case the pressure must act at the same time in the two boxes and in order to do this the conduit 35 must communicate with the pipes 36 and 39 supplying respectively the servo-motors of the gear boxes D and E as indicated on Fig. 9a. When the speed of rotation of the engine continues to increase, the pressure of the oil in the by-passes 187 and 188 increases in consequence. This does not modify the position of the slide valve 47 of the distributor G but when the pressure of the oil in the distributor N has become sufficient to overcome the retaining effort of the ball 181 and of the spring 194 there is obtained a rapid movement of the slide valve 180 towards its second active position (Fig. 9b) for which the conduit 39 of the box D remains under pressure and the conduit 36 of the box E is in discharge, which corresponds to the bringing into action of the second speed. When the speed of rotation of the engine, which has undergone an increase after slowing down by reason of the change of the speed gear, increases still further, the slide valve 180 is brought to its "3rd speed" position for which the conduit 39 of the box D is in discharge and the conduit 36 of the box E under pressure (Fig. 9c). Finally the engagement of the "4th speed" is obtained when the slide valve 180 is at its extreme position for which the two conduits 39 and 36 are put into discharge (Fig. 9d). The movement of the slide valve 180 in the opposite direction takes place at the time of the lowering of the speed of rotation of the engine, through the action of the spring 189.

It should be noted that the control of the gear box, by a distributor such as N, can also be applied in the case of a semi-automatic control by the driver who then displaces by hand and this only by way of emergency control, the slide valve 180 in order to bring it to the desired characteristic position.

The control of the clutch B during the speed changes takes place exactly as for the preceding examples by the distributor H the slide valve 77 of which can be arranged according to any one of the methods already described, the devices functioning with the aid of the oil at centrifugal pressure necessitating no modification of the distributor H.

For instance, as shown in Fig. 9, the slide valves G and H and mechanism K of Fig. 1 are used. It is obvious that the lever 125 controlling the position of slide valve 180 occupies four different positions for the different speed ratios. The end of lever 125 is insulated and is provided with a contact sliding over the surface of an opposed contact member 78x. The contact on the end of lever 125 is connected to line 80, while contact 78x is connected to a source of current 81. Contact member 78x has insulating portions opposite the contact on lever 125 for each position of valve 180 corresponding to the engagement of some gear ratio, and between these insulating portions the member 78x is provided with conducting portions.

It is evident that as the member 180 moves from the position corresponding to one gear ratio to that corresponding to the next, contact will be made between the end of lever 125 and the member 78x, and current will therefore flow through wire 80 to the mechanism K. This will cause at each change from one gear ratio to another the disengagement and re-engagement of the clutch in the same manner as is explained for Fig. 2.

The operation of the rod 193 requires a rather considerable effort which can be greatly reduced by causing to act on the slide valve 180 of the distributor N an oil pressure which varies proportionally to the stress of the spring 189, according to the same principle as that which has been adopted to obtain the "centrifugal pressure."

Figure 10:
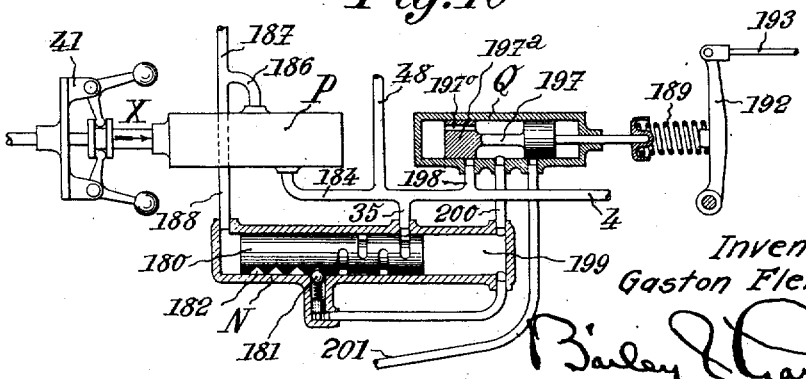
Fig. 10 shows, partly in elevation and partly in vertical section, a first modification of a control arrangement similar to that shown in Fig. 9.

Such a construction is shown on Fig. 10 for which the spring 189 acts on the slide valve 197 of a distributor Q the supply pipe 198 of which is branched on the delivery conduit 4 of the pump. The middle space of the said distributor is connected, in a permanent maner and by a conduit 200 to the space 199 which is located at the right of the slide valve 180 of the distributor N. A discharge conduit 201 also proceeds from the distributor Q to open into the general discharge pipe. The lack of equilibrium of the slide valve 197 is assured—for example by providing a passage 197o in the obturating part 197a. By the influence of the spring 189 and by the thrust of the oil which acts in the opposite direction on the slide valve 197, the pressure of the oil supplied through the conduit 200 becomes proportional to this thrust and this pressure in this case acts as opposing force on the slide valve 180 against the pressure of oil delivered by the distributor P and by the by-pass 188. This pressure can then be distributed to various apparatus, if necessary, as has been explained for the "centrifugal pressure" oil circuit.

The reduction of the force necessary for the operation of the lever 192 in order to modify, if necessary, the stress of the spring 189 results in this case from two facts. The slide valve 197 of the distributor Q has a stroke considerably less than that of the slide valve 180 of the distributor N in such a way that the work to be produced is already less for an equal force. Moreover this force can, itself, be very reduced if there is given to the diameter of the slide valve 197 a value clearly lower than that of the slide valve 180.

Up to the present there have been shown examples of means by which an oil pressure could follow the variations of a determined functional factor, for example the centrifugal force X of a governor as regards the distributor P, the suction as regards the distributor H or the power of a spring, as regards the distributor Q.

On Fig. 10 the distributors P and Q received respectively the actions of the centrifugal force X and of the spring 189 and transformed them into an oil pressure proportional to these actions, pressures acting respectively on the slide valve 180, by thrust on its two bases.

Figure 11:
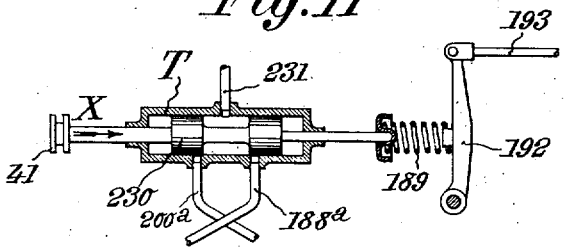
Fig. 11 is a similar view of a modification of the control arrangement according to Fig. 10, in which two fluid distributors are combined into a single device.

Fig. 11 shows an arrangement for which the distributors P and Q are combined into a single distributor T, the slide valve 230 of this latter being influenced in opposition by the two actions in question in such a way as to be controlled by their resultant. The distributor T is supplied with fluid under pressure through the conduit 231 connected in a permanent manner to the delivery conduit 4 of the pump 2. When the slide valve 230 is in equilibrium under the action of the two aforesaid forces, its two obturating parts respectively close the two exhaust conduits 188a and 200a opening into the distributor N in such a way as to be able to act, when they are supplied, on the ends of the slide valve 180 of this distributor N (Fig. 10).

When the centrifugal force is preponderant, it displaces the slide valve 230 of the distributor T, which uncovers the conduit 188a and the oil under pressure forces the slide valve 180 of the distributor N towards the right as for the arrangement according to Fig. 10. On the other hand, if the spring 189 becomes preponderant, the conduit 200ᵃ is supplied, which pushes the slide valve 180 back towards the left of Fig. 10.

Figure 12:
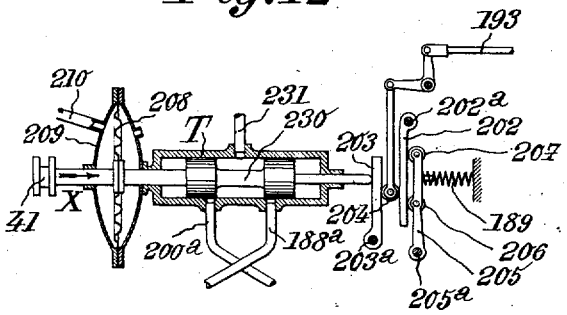
Fig. 12 shows in a similar manner a modification of the arrangement of Fig. 11, in which the device is operated on by two variable control forces.

The arrangement according to Fig. 12 shows an extension of this method since on a single distributor T there is made to act at the same time a centrifugal force X, a force created by the suction existing in the suction pipe of the engine (chamber 209, diaphragm 208 and piping 210), a spring 189 and a variable lever-arm arrangement in order to be able to regulate the action of the spring 189 on the slide valve 230. This device can be constituted by two levers 202 and 203 articulated at fixed points 202ᵃ and 203ᵃ provided at their opposite extremities. Between these levers there is engaged a sliding member for example a roller 204 controlled by the rod 193 in such a way that the relative position of the said roller can be modified without considerable effort with respect to the points of articulation. As a result thereof the lever arms, by which the tension of the spring 189 is transmitted to the slide valve 230, can consequently be modified, which makes the opposing effect of the said spring vary in the desired proportions. Advantageously there is provided between the spring 189 and the lever 202 an arm 205 capable of oscillating around a fixed point 205ᵃ and which is in contact with the said lever 202 by two points 206 and 207 spaced apart the one from the other. According to the inclined positions which the levers 202 and 203 come to occupy in the course of the operation, the action of the spring 189 is thus transmitted to the lever 202 by clearly different lever arms according as the inclination takes place in one direction or the other.

When the resultant of all these forces, acting on the slide valve 230 of the distributor T, displaces this slide valve towards the right of Fig. 12, the conduit 188ᵃ is supplied and the oil pressure, thus sent to the distributor N (Fig. 10), displaces the slide valve 180 of this latter in the same direction for example. If on the contrary the resultant were of opposite direction, the conduit 200ᵃ would be uncovered and the slide valve 180 would be displaced in the opposite direction.

By the devices according to Figs. 11 and 12 the oil pressure sent to the distributor N is not graduated because for these examples such a proportioning is not necessary. If it were desired to obtain a variation of the pressure it would be sufficient to supply the conduit 231 by a supply-distributor similar to one of those already described.

There are advantageously associated with the transmission such as described means adapted to prevent the vehicle moving accidentally in the opposite direction to that corresponding to the positions in which, at this moment, the operating members are located. In other words, these means prevent, for example, the rearward movement of the vehicle when the members of the transmission are in the position of forward running or inversely.

The hydraulic control such as described above can be completed by very simple devices in order to satisfy these conditions without any intervention on the part of the driver other than that of the operation of the member 19 by which he determines the direction of running of the vehicle, for example through the intermediary of the reversing device C of Fig. 1. As already stated it is assumed that the general rod 40¹ which acts on the brakes (not shown) is controlled exclusively or accessorily by a small servo-motor 40 with hydraulic control (oil under pressure).

This servo-motor 40 is controlled through the intermediary of a distributor S (Fig. 13) the supply to which takes place through a conduit 211 branched on the conduit 15 which proceeds from the distributor G of the servo-clutch 14—17. The slide valve 212 of the distributor S comprises two obturating parts 212ᵃ and 212ᵇ which when the slide valve occupies its middle position obturate, on the one hand, respectively passages 213 and 214 branched on the conduit 211 upstream of the distributor S and, on the other hand, respectively passages 215 and 216 communicating permanently with a conduit 217 branched on the conduit 37 opening into the general discharge tube 5. For this middle position the middle space of the slide valve 212 also establishes communication between the conduit 211 coming from the distributor G of the clutch and the supply conduit 218 of the servo-motor 40 for the brakes which applies the brakes when the oil under pressure is admitted into the servo-motor.

The slide valve 212 is controlled by a lever 219 oscillating around its centre and one extremity of which is connected by a rod 220 to the member 19, by which the driver determines the direction of running of the vehicle, this rod being articulated, for example, to the control arm 18 of the reversing device C (Fig. 1). The other extremity of the oscillating lever 219 is connected to a fork 221 engaged for example in a groove of a tapped sleeve 222, co-operating with a threaded part 223 of the output shaft of the change-speed gear. Two collars provided on the said shaft 25 on each side of the threaded part 223 prevent the axial displacement of the sleeve 222 beyond its corresponding extreme positions. Retaining means, such as a ball 224 influenced by a spring 225, tend to prevent the rotation of the sleeve 222 with respect to the shaft 25 and for this purpose this ball penetrates in part into longitudinal grooves 226 provided in the exterior face of the said sleeve. According to the direction of rotation of the shaft 25, the sleeve 226 comes to occupy one or the other of its extreme positions by screwing or by unscrewing on the threaded part 223 retained by the ball 224. Then this ball jumps from one groove to the other without further effect. When the rotation of the shaft 25 takes place in the direction corresponding to the position occupied by the sleeve 222, this latter remains in position and the lever 219 occupies one of the vertical positions I or III. On the other hand, if the rotation of the shaft 25 took place in the opposite direction, the ball 224 would retain the sleeve which would move on the threaded part 223 like a nut and would come to occupy its other extreme position by driving the oscillating lever 219 towards an oblique position II or IV. Now the two vertical positions I and III correspond to the two extreme positions of the slide valve 212 for which the oil under pressure cannot reach the piping 218 which leads to the servo-brake 40. The brakes are therefore released. On the other hand the two oblique positions II and IV place the slide valve 212 in its middle position at which the oil under pressure coming through the conduit 211 can reach, through the conduit 218, the servo-brake which applies the brakes of the vehicle.

It has been said that the conduit 211 is branched on the servo-clutch 14—17. This is necessary for the following reason. If it is supposed that a driver stops his vehicle in an ascent without applying his brakes, on stopping the servo-declutching device functions, uncoupling the engine from the rest of the transmission. The vehicle will therefore tend to move rearwardly, which places the oscillating lever 219 in an oblique position and immediately causes the application of the brakes, as explained above, since the servo-brake takes the oil under pressure necessary for its operation from the servo-declutching device then supplied with the total pressure. But when the driver wishes to re-start, it is necessary for the brakes to be released and that takes place quite naturally when in consequence of the increase in the speed of rotation of the engine, the servo-declutching device loses its pressure so that the engagement of the clutch can take place. The fall of pressure is transmitted to the servo-brake 40 which releases the brakes in proportion as the clutch engages (fall of pressure). As soon as the vehicle has started, by reason of the correct direction of running, the lever 219 again assumes a vertical position, which completely eliminates the application of the brakes.

Figure 13:
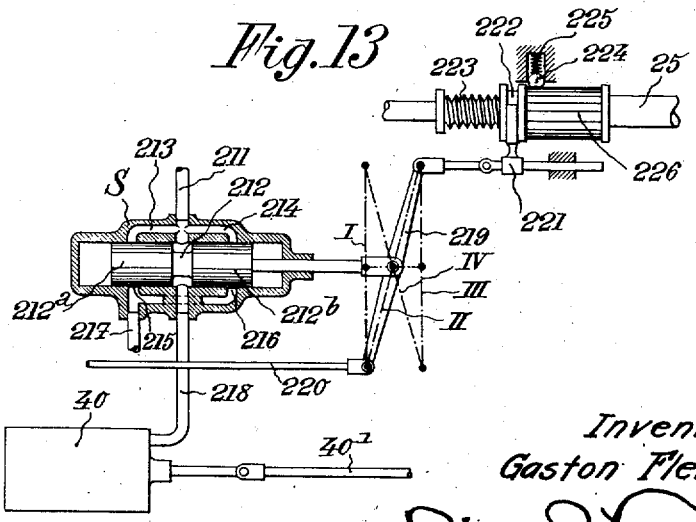
Fig. 13 shows, on a larger scale and in vertical section, a control device for the brakes of the transmission shown on Fig. 1.

Moreover, it should be noted that the application of the brakes by the automatic control according to Fig. 13 cannot take place so long as the clutch is engaged (oil pressure null in the servo-declutching device 14—17), which is a complete safety device during the running of the vehicle.

*In some of the appended claims, reference is made, in varying language, to a governor driven by the engine. This language is not intended to limit the claims to any particular functional connection between the engine and the governor; and is satisfied if the governor is driven by, or varied with variations in engine speed, during at least one operating condition (such as direct drive between the engine and the driven shaft) of the vehicle.*

What I claim is:

1. In the combination of an engine, a mechanism operatively connected to said engine, and a control arrangement operatively connected to said mechanism to control the same at least partially in response to variations in the operating conditions of said engine, said control arrangement comprising a servo-motor device operatively connected to said mechanism, means to supply operating fluid to said servo-motor device, a distributor in said supply means, and means to exert on said distributor a force of two components one of which varies in accordance with variations in the operating conditions of the engine and the other of which is exerted by said operating fluid and varies in accordance with variations in the operation of said mechanism.

2. In the combination of an engine, a mechanism operatively connected to said engine, and a control arrangement operatively connected to said mechanism to control the same at least partially in response to variations in the operating conditions of said engine, said control arrangement comprising a servo-motor device operativaly connected to said mechanism, means to supply operating fluid to said servo-motor device, and means to control the supply of operating fluid including a valve, means to exert on said valve a force which varies in response to variations in the operating conditions of the engine and a second force which is exerted by said operating fluid and varies in accordance with the position of said valve.

3. In the combination of an engine, a mechanism operatively connected to said engine, and a control arrangement operatively connected to said mechanism to control the same at least partially in response to variations in the operating conditions of said engine, said control arrangement comprising a servo-motor device operatively connected to said mechanism, means to supply operating fluid to said servo-motor device, and means to control the supply of operating fluid including a valve, means to exert on said valve a force which varies in response to variations in the operating conditions of the engine and a second force which varies in accordance with the position of said valve, the variations of said second force being algebraically opposite to the variations in said first force.

[4. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine.]

5. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby exerts a force on the distributor, and means to exert on said distributor an opposing force which varies with variations in the operating conditions of the engine, *said arrangement of the distributor including a portion to receive said fluid force and a second portion for receiving said opposing force, said last named means being at least in part external of said distributor.*

6. In the combination of an engine, a mechanism operatively connected thereto, and means including a servo-motor to operate said mechanism, means to supply fluid to said servo-motor, and control means for said fluid including a casing, a valve slidable in said casing, a source of fluid under pressure, an inlet opening from said source into said casing, outlet openings from said casing, one of said outlet openings constituting a discharge, said openings being spaced along said casing in the direction of movement of said valve, said valve having obturating portions adapted to close the two end openings or to uncover said openings selectively and having a part of less cross section connecting said obturating portions opposite the intermediate opening, one of said end openings being the discharge opening, said obturating portions having different effective areas so that pressure fluid within the space between said obturating portions tends to move said valve in one direction, and means to exert on said valve a force which varies with variations in the operating conditions of the engine.

[7. In the combination of an engine, a mechanism operatively connected thereto, and means including a servo-motor to operate said mechanism, means to supply fluid to said servo-motor, and control means for said fluid including a casing, a valve slidable in said casing, a source of fluid under pressure, an inlet opening from said source into said casing, outlet openings from said casing, one of said outlet openings constituting a discharge and the other being connected to said servo-motor, said openings being spaced along said casing in the direction of movement of said valve, said valve having obturating portions adapted to close the two end openings or to uncover said openings selectively and having a part of less cross section connecting said obturating portions opposite the intermediate opening, said end openings being the outlet openings, said obturating portions having different cross sections so that pressure fluid within the space between said obturating portions tends to move said valve in one direction, means to exert on said valve a force in the same direction which varies with variations in an operating condition of the engine, and a spring acting on said valve opposing said last means.]

[8. In the combination of an engine, a clutch operatively connected thereto, means resiliently urging said clutch to engaged position, and a servo-motor for disengaging said clutch against the action of said resilient means, means to supply fluid to said servo-motor, and control means for said fluid including a casing, a valve slidable in said casing, a source of fluid under pressure, an inlet opening from said source into said casing, outlet openings from said casing, one of said outlet openings constituting a discharge and the other being connected to said servo-motor, said openings being spaced along said casing in the direction of movement of said valve, said valve having obturating portions adapted to close the two end openings or to uncover said openings selectively and having a part of less cross section connecting said obturating portions opposite the intermediate opening, said end openings being the outlet openings, said obturating portions having different cross sections so that pressure fluid within the space between said obturating portions tends to move said valve in one direction, and means to exert on said valve a force which varies with variations in the operating conditions of the engine.]

[9. In the combination of an engine, a clutch operatively connected thereto, means resiliently urging said clutch to engaged position, and a servo-motor for disengaging said clutch against the action of said resilient means, means to supply fluid to said servo-motor, and control means for said fluid including a casing, a valve slidable in said casing, a source of fluid under pressure, an inlet opening from said source into said casing, outlet openings from said casing, one of said outlet openings constituting a discharge and the other being connected to said servo-motor, said openings being spaced along said casing in the direction of movement of said valve, said valve having obturating portions adapted to close the two end openings or to uncover said openings selectively and having a part of less cross section connecting said obturating portions opposite the intermediate opening, said end openings being the outlet openings, said obturating portions having different cross sections so that pressure fluid within the space between said obturating portions tends to move said valve in one direction, means to exert on said valve a force in the same direction which varies with variations in an operating condition of the engine, and a spring acting on said valve opposing said last means.]

10. In the combination of an engine, a clutch operatively connected thereto, means resiliently urging said clutch to engaged position, and a servo-motor for disengaging said clutch against the action of said resilient means, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine.

11. In the combination of an engine, a mechanism operatively connected thereto, and means including a servo-motor to operate said mechanism, means to supply fluid to said servo-motor, and control means for said fluid including a slidable member adapted to be moved by fluid under pressure and controlling said fluid supply means, a casing, a valve slidable in said casing, a source of fluid under pressure, an inlet opening from said source into said casing, outlet openings from said casing, one of said outlet openings constituting a discharge and the other supplying fluid to move said slidable member, said openings being spaced along said casing in the direction of movement of said valve, said valve having obturating portions adapted to close the two end openings or to uncover said openings selectively and having a part of less cross section connecting said obturating portions opposite the intermediate opening, one of said end openings being the discharge opening and the other being the inlet opening, said obturating portions having different effective areas so that pressure fluid tends to move said valve in one direction, and means to exert on said valve a force in the opposite direction which varies with variations in the operating conditions of the engine.

12. In a device as defined in claim 1, a resilient locking means for said distributor.

13. In a device as defined in claim 1, a resilient locking means for said distributor which is automatically variable as a function of the operating conditions of said engine.

14. In a device as defined in claim 1, dashpot means exerting a retarding effect on said distributor for one direction of the movement thereof.

15. In a device as claimed in claim 1, means to prevent the operation of said distributor until the speeds of members to be interconnected by the functioning of said servo-motor are substantially synchronised.

16. In a device as defined in claim 10, means controlled by the driver for causing disengagement of the clutch.

17. In a device as defined in claim 6, variable stopping means for retaining said valve temporarily in one of its extreme positions.

18. In the combination of an engine, a mechanism operatively connected thereto, and means including a servo-motor to operate said mechanism, means to supply fluid to said servo-motor, and control means for said fluid including a valve, means to exert on said valve a force which is exerted by said operating fluid and varies with variations in the position of the valve, and means to exert on said valve a force which varies with variations in the operating conditions of the engine.

*19. In the combination of a motor vehicle having an internal combustion engine with means for varying the charge to said engine, power transmitting means for transmitting the driving torque of the vehicle, said power transmitting means including a clutch mechanism operatively connected to the engine and arranged so it transmits the driving torque of the vehicle when it is engaged, means including a servo-motor for operating said clutch mechanism, fluid-supply means to supply fluid to said servo-motor, and* control means for said fluid which causes the clutch to become disengaged as the vehicle speed decreases, said control means including a distributor and a casing for the distributor, said casing defining three openings through the side wall thereof and spaced along the casing in the direction of the movement of the distributor, one end opening being an inlet opening for receiving said fluid, the intermediate opening being an outlet opening and never covered by either piston, and the other end opening being a discharge, said openings being positioned so that the inlet opening feeds fluid to said space and the discharge opening is closed when the distributor is in one operating position and the inlet opening closed and the discharge one open when the distributor is in a second operating position, said distributor including two spaced pistons interconnected by a part of smaller cross-section than either of the pistons, said pistons having different effective areas exposed to any fluid in the space between them whereby said distributor is so constructed and arranged that the fluid controlled thereby exerts a force on said distributor, means to exert on said distributor an opposing force which varies with variations in the operating conditions of the engine, a governor whose speed varies with the vehicle speed when the vehicle slows down from its higher driving speeds, and means to exert on said distributor a force in the same direction as the first-named force and which increases when the governor speed increases, said fluid-supply means including fluid conducting means connecting said outlet to said servo-motor.

20. The combination defined in claim 19 including in addition a spring biasing said distributor in a direction opposite that of said first force.

21. The combination of claim 19 in which the inlet opening is positioned in the space between pistons and adjacent the piston of smaller effective area so that the force of the fluid on the other piston tends to move the distributor in a direction tending to close the inlet opening.

22. The combination of claim 21 in which said clutch has a spring tending to resiliently urge said clutch into engaged position.

23. In the combination of a motor vehicle having an engine for driving the same, a clutch mechanism operatively connected to said engine for transmitting the driving torque of the engine to the driven part of the vehicle when the clutch is in engaged position, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine comprising a governor for controlling the force to reduce the same as the speed of the vehicle decreases from high speed, said control means including means to control the fluid to effect engagement of the clutch when the distributor is in a first position and to control the fluid to effect disengagement of the clutch when the distributor is in a second position, said force-exerting means being so arranged that the force exerted thereby tends to move the distributor toward the first position when the vehicle speed increases and tends to reduce the force exerted thereby when the vehicle speed decreases, said control means having a fluid inlet opening for admitting the fluid which tends to move the distributor, said opening being so positioned as to be closed by said distributor in one of said positions, said control means also having a fluid outlet opening for passing the fluid controlled by the distributor, said fluid supply means comprising a direct fluid connection from said outlet opening to said servo-motor, and fluid pumping means driven by some driven part of the vehicle for supplying liquid fluid under pressure to said inlet opening.

24. The combination of claim 23 in which said distributor includes means so arranged that the force of the fluid controlled by the distributor tends to move the distributor in a sense the same as the sense of the force which is controlled by said governor.

25. The combination of claim 24 in which said control means is so constructed and arranged that the distributor motion is abrupt when the governor speed decreases to such an extent that the distributor is moved to said second position.

26. The combination of claim 25 having in addition a spring biasing said distributor in a direction opposite to the direction in which the force of the fluid tends to move the distributor.

27. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby exerts a force on the distributor, and means to exert on said distributor an opposing force which varies with variations in the operating conditions of the engine and normally increases when the charge to the engine increases from meagre to full charge, said engine being an internal combustion engine having means which jointly varies the charge to the engine and influences the means that exerts said opposing force.

28. The combination of claim 27 in which said mechanism comprises a load and a clutch interposed between said engine and said load under certain conditions of operation, the clutch being engaged and disengaged by said servo-motor.

29. The combination of claim 28 having in addition a centrifugal governor and means responsive to the centrifugal forces developed in said governor for exerting a force on said distributor which tends to move it in the same direction as does the operating fluid, and means for driving said governor at a speed proportional to that of the load during the period when load speed decreases from its higher speeds.

30. The combination of claim 29 in which said control means includes means whereby when the distributor is in a first position the operating fluid is controlled to effect clutch engagement and when the distributor is in a second position the fluid is controlled to effect clutch disengagement, the means responsive to centrifugal forces being arranged such that it exerts a force tending to move the distributor toward the first position when governor speed increases, the means to exert said opposing force being arranged to tend to move the distributor toward the second position when the charge to the engine increases.

31. The combination of claim 30 in which said control means is so constructed and arranged that said distributor moves abruptly from said first position to said second position.

32. The combination of claim 31 having in addition a spring biasing said distributor toward said second position.

33. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine, said mechanism comprising a driven shaft and a clutch for transmitting torque from the engine to the driven shaft when the clutch is in engaged position, said clutch comprising two friction-engaging surfaces, said servo-motor including a plunger and a cylinder containing said plunger, said plunger being conected mechanically to one of said surfaces for controlling the engagement and disengagement of said surfaces, the construction and arrangement of the distributor being such that it has a casing which is tubular and contains spaced interconnected pistons of different effective areas; said casing defining an inlet opening closed by the first of the pistons when they are in a second position and is open to permit fluid flow to said space when the pistons are in a first position, said casing also defining a discharge opening through the side wall thereof positioned so it opens into the space between pistons when they are in the second position and is closed by the second of the pistons when they are in said first position, said casing also defining an outlet opening extending directly from said space through the side wall of the casing when the pistons are in either of said positions, said means to supply fluid to the servo-motor including fluid conducting means providing a direct fluid path from said outlet opening to said cylinder whereby the fluid pressure in said space acts on said plunger to control engagement of the said surfaces.

34. The combination of claim 2 in which said means which controls the supply of operating fluid is so constructed and arranged that in response to changes in at least one of the forces on the valve the valve abruptly moves in one direction from one operating position to another operating position, one of which operating positions blocks fluid flow to the servo-motor and the other of which permits such flow; said mechanism including a driven shaft and two friction-engaging surfaces whose engagement is controlled by said servo-motor and which when engaged cause the engine to be coupled to the driven shaft.

35. The combination of claim 2 in which the last-named means is so constructed and arranged that the first and second forces oppose each other, said mechanism comprising a driven shaft together with two friction-engaging surfaces which when engaged cause the engine to be coupled to the driven shaft and whose engagement is controlled by said servo-motor, a centrifugal governor driven by said engine under certain conditions, and means responsive to the centrifugal forces developed in said governor for applying to said valve a third force opposite to the first-named one.

36. The combination of claim 5 in which said mechanism comprises a clutch having a driving shaft connected to the engine and a driven shaft, and governor means driven by one of said shafts for exerting a force on said distributor additive to the fluid force thereon.

37. In the combination of an engine, a mechanism operatively connected thereto and driven thereby comprising a planetary gear and clutch assembly, said clutch having a clutch element and the planetary gear having another element which is operable to change the gear ratio, means including servo-motors for operating each of said elements respectively, means to supply fluid to said servo-motors, and control means for said fluid to control the operations of said elements, said control means including a distributor for controlling the fluid fed to at least one of said servo-motors, said distributor being so constructed and arranged that the fluid controlled thereby tends to move the distributor, and means to exert on said distributor a force which varies with variations in the operating conditions of the engine.

38. The combination of claim 37 in which said control means defines a discharge opening which is progressively vented when the distributor moves in the direction of the fluid force thereon to thereby regulate the pressure of the control fluid.

39. The combination of claim 37 in which the construction and arrangement of said distributor is that it has two interconnected pistons of different effective areas, and a source of fluid under pressure feeding said control means and fed between said pistons.

40. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine, the last-named means including means responsive to one operating condition of the engine for exerting a force on said distributor, the last-named means also including means responsive to another operating condition of the engine for exerting a force on the distributor.

41. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine, said fluid supply means including a conduit from the control means to the servo-motor, a fluid pump driven by the engine for supplying fluid under pressure to said control means, said control means defining a discharge opening for discharging fluid from said source to thus reduce the fluid pressure applied to the servo-motor, said opening being so positioned as to be progressively vented by the distributor as the latter moves in the direction of the fluid force thereon, said mechanism comprising a clutch driven by the engine and controlled by said servo-motor.

42. The combination of claim 41 in which the engine is an internal combustion engine having means for varying the charge thereto and in which the means for exerting a force on said distributor comprises speed responsive means driven by the engine for varying said force.

43. In the combination of an engine, a mechanism operatively connected thereto, and means including a servo-motor to operate said mechanism, means to supply fluid to said servo-motor,

*and control means for said fluid including a distributor, said distributor being so constructed and arranged that the fluid controlled thereby tends to move the distributor, and means to exert on said distributor a force which varies with variations in the operating conditions of the engine, said engine being an internal combustion engine, and a control lever for varying said force.*

*44. In the combination of an engine, a mechanism operatively connected thereto, and means including a servo-motor to operate said mechanism, means to supply fluid to said servo-motor, and control means for said fluid including a distributor, said distributor being so constructed and arranged that the fluid controlled thereby tends to move the distributor, and means to exert on said distributor a force which varies with variations in the operating conditions of the engine, said engine being an internal combustion engine; a control lever for varying said force; the last-named means also including means at times responsive to engine speed for varying said force.*

*45. The combination of claim 5 in which the control means has a fluid inlet opening for receiving the fluid to be controlled, positioned so it is progressively closed by the distributor when the latter is moved in the direction of the fluid pressure on the distributor.*

*46. The combination of claim 44 in which the distributor is so constructed and arranged that the force of the fluid thereon is additive to the force exerted by said speed responsive means.*

*47. The combination of claim 1 in which said engine is an internal combustion engine and in which the force exerting means includes the following elements for effecting the first component of force: a spring one end of which is fixed and the other end of which biases the distributor in a direction opposed to the second component of force, a suction chamber connected to and subject to the pressure of said intake manifold, said suction chamber including a diaphragm mechanically separate from the distributor but arranged to exert pressure on the distributor in one direction and arranged to reduce the first component of force when the manifold pressure decreases, and a second spring biasing said diaphragm in a direction to increase the first component of force and maintain driving contact between the diaphragm and the distributor.*

*48. The combination of claim 1 in which said engine is an internal combustion engine having an intake manifold, and in which the force exerting means includes the following elements for effecting the first of said components of force: a spring biasing the distributor in a direction opposed to the second component of force and a suction chamber connected to said intake manifold, said suction chamber including a diaphragm connected to the distributor for reducing the first component of force when the manifold pressure decreases.*

*49. The combination of claim 5 in which said engine is an internal combustion engine having an intake manifold; and in which the means for exerting the said opposing force includes a spring biasing the distributor in opposition to the force of the fluid and also includes a suction chamber connected to said intake manifold, said suction chamber including a diaphragm for modifying the force on the distributor to decrease the opposing force when the pressure in the manifold decreases and to increase the opposing force when the pressure in the manifold increases.*

*50. The combination of claim 5 in which said engine is an internal combustion engine having an intake manifold, in which said mechanism includes a clutch which is engaged and disengaged by said servo-motor, in which said construction and arrangement of said distributor is that it has a land which is exposed on one side thereof to the fluid pressure existing in said servo-motor, thereby exerting a force on the distributor in a first direction, in which said means for exerting a force on said distributor includes a spring biasing the distributor in a second direction opposite to the first direction and also includes a suction chamber connected to said intake manifold, said chamber including a diaphragm which tends to press the distributor in the second direction when pressure in the chamber increases and which tends to decrease its pressure on the distributor when the pressure in the chamber decreases, said distributor having a casing with a first opening for receiving fluid from said source, said casing defining a discharge opening, and said distributor being so constructed and arranged that it blocks fluid flow from the first to the second opening when the distributor is moved in the second direction to its extreme position and which progressively vents the second opening to permit progressively greater discharge from the second opening and thus reduce the fluid pressure as the distributor moves in the first direction beyond a predetermined position.*

*51. The combination of claim 5 in which the engine is an internal combustion engine having an intake manifold, in which the mechanism is a motor vehicle clutch operated by the servo-motor, in which said construction and arrangement of said distributor is that it has a piston pressed in a first direction by the fluid pressure existing in said servo-motor, and in which the means that exerts a force on said distributor includes suction responsive means controlled by the suction in said intake manifold for varying said opposing force to increase it when the pressure in said manifold increases; said distributor including a casing having a discharge vent therein so positioned as to be vented to an increasing degree by the distributor as the latter moves in the first direction, a planetary gear assembly connected to the output side of said clutch, said planetary gear assembly including a control surface which when moved in a predetermined manner shifts the gear assembly from one ratio to another ratio, a servo-motor controlling the movement of said control surface, a gear shift lever under the control of the driver, and means operated by said lever for controlling the flow of fluid to said last-named servo-motor and for also modifying the fluid pressure in the first-named servo-motor to effect operation of the clutch.*

*52. The combination of claim 18 in which said control means has a discharge opening which is progressively vented as the valve moves beyond a predetermined position in the direction of the force of the fluid thereon.*

*53. The combination of claim 18 in which said engine is an internal combustion engine having an intake manifold, in which the mechanism is a clutch driven by said engine, a chamber connected to said intake manifold, said chamber having a diaphragm for exerting a force on said valve which opposes the fluid force and which increases when the chamber pressure increases.*

*54. The combination set forth in claim 5, said engine being of the internal combustion type having an intake manifold and a lever movable under the control of the operator between open and*

*closed positions to vary the flow of fuel through said intake manifold, said flow of fuel being one operating condition of said engine and the position of said lever as set by the operator being another operating condition of said engine, said intake manifold having a degree of vacuum therein which is at least in part a function of the degree of displacement of said lever from closed position, a governor means connected and arranged to apply a force to said distributor which varies at least in part as a function of the speed of said engine, and acts against said opposing force.*

*55. The combination set forth in claim 54, a compression spring acting on said distributor as part of said means to exert an opposing force on said distributor, said distributor being a shift valve distributor for primary control of the operation of said mechanism, a second distributor, means to supply fluid to said second distributor, said second distributor being so constructed and arranged that fluid supplied thereto and controlled thereby exerts a force on said second distributor, means to exert on said second distributor the same force which varies with variations in the said first operating condition of said engine, and means affording passage for fluid controlled by said second distributor whereby said fluid controlled by said second distributor may reach said servo-motor and affect its action.*

*56. The combination set forth in claim 5, said engine being of the internal combustion type having an intake manifold having a degree of vacuum therein, said degree of vacuum being an operating condition of said engine, a chamber connected to said intake manifold, diaphragm-piston combination acted upon by the vacuum within said chamber, a compression spring exerting a force on said diaphragm-piston combination in a direction opposite to that exerted by said vacuum, a lever for applying the force exerted by said diaphragm-piston combination to said distributor in opposition to the force exerted on said ditributor by the fluid controlled thereby, a compression spring acting on said distributor in the same direction as the force exerted by said lever, said means to exert on said distributor an opposing force being in part a compression spring acting directly on said distributor.*

*57. In combination, a vehicle having an engine of the internal combustion type having an intake manifold and a lever movable under the control of the operator between open and closed positions to vary the flow of fuel through said intake manifold, said flow of fuel being one operating condition of the engine and the position of said lever as set by the operator being another operating condition of the engine, said intake manifold having a degree of vacuum therein which is at least in part a function of the displacement of said lever from closed position, a mechanism operatively connected to said engine, and means including aservo-motor to operate said mechanism, means to supply fluid to said servo-motor, pressure control means for said fluid including a regulator valve, a valve casing, said casing and said valve being so constructed and arranged that said operating fluid exerts on said valve a force which varies with variations with the axial position of said regulator valve and pump means to exert on said valve through said fluid a force which varies with variations in the operating speed of the engine, a second control valve means for the supply of fluid to said servo-motor, a governor means connected and arranged to apply a force to said second valve which varies at least in part as a function of the speed of said engine, a compression spring acting on said second valve against the force applied by said governor means and means including said lever to apply a force on said second valve opposed to the combined force of said compression spring and said governor means.*

*58. The combination set forth in claim 57, a selector valve means connected to said second valve to provide proper distribution of said fluid to accomplish that performance of said mechanism selected by the operator and linkage means connected to said selector valve means for operation thereof by the operator.*

*59. The combination set forth in claim 18, said engine being of the internal combustion type having an intake manifold and a lever movable under the control of the operator between open and closed positions to vary the flow of fuel through said intake manifold, said flow of fuel being one operating condition of the engine and the position of said lever as set by the operator being another operating condition of the engine, said intake manifold having a degree of vacuum therein which is at least in part a function of the displacement of said lever from closed position, a vehicle mounting said engine, a driving shaft, a driven shaft, said mechanism comprising a transmission for connecting said shafts as a result of engagement of friction members, said control means having a slidable member adapted to be moved by fluid under pressure and controlling said fluid supply means, said control means having a casing, said valve having spaced obturating portions slidable in said casing, a fluid inlet in said casing, an outlet opening in said casing, said openings being spaced along said casing and being selectively opened by movement of said valve, and means controlled at least in part by the position of said lever to exert on said valve a force on a part of said valve other than that acted upon by said first mentioned force.*

*60. The combination set forth in claim 59, a compression spring acting upon said valve in conjunction with said first named force and forming therewith a resultant force opposed to the force exerted by said last named means.*

*61. The combination set forth in claim 5, said distributor having portions of differing effective area, a lever, a resilient member acted on by said lever and exerting a force on said distributor, said lever being under the control of the operator, a slidable member in a casing connected to receive fluid controlled by said distributor and to direct operating fluid so that said servo-motor will function as desired by the operator.*

*62. The combination set forth in claim 61, and means for introducing hysteresis in the movement of said slidable member.*

GASTON FLEISCHEL.

REFERENCES CITED

The following references are of record in the file of this patent or the original patent:

UNITED STATES PATENTS

| Number | Name | Date |
|---|---|---|
| Re. 21,844 | Vetter | June 24, 1941 |
| 907,711 | Anthony | Dec. 29, 1908 |
| 1,199,640 | Vincent | Sept. 26, 1916 |
| 1,980,797 | Hale | Nov. 13, 1934 |
| 1,980,798 | Hale | Nov. 13, 1934 |
| 2,094,449 | Forichon | Sept. 28, 1937 |